United States Patent
Lane

(10) Patent No.: US 12,416,377 B1
(45) Date of Patent: Sep. 16, 2025

(54) BIDIRECTIONAL AIRFLOW ATTACHMENT HOSE AND METHODS OF USE

(71) Applicant: Drug Careers, Inc.

(72) Inventor: Lisa A. Lane, Clarksburg, NJ (US)

(73) Assignee: Drug Careers Inc., Clarksburg, NJ (US)

( * ) Notice: Subject to any disclaimer, the term of this patent is extended or adjusted under 35 U.S.C. 154(b) by 99 days.

(21) Appl. No.: 18/208,889

(22) Filed: Jun. 13, 2023

Related U.S. Application Data

(60) Provisional application No. 63/366,689, filed on Jun. 20, 2022.

(51) Int. Cl.
*F16L 33/32* (2006.01)
*F16L 37/04* (2006.01)
*F16L 37/26* (2006.01)

(52) U.S. Cl.
CPC ............. *F16L 37/04* (2013.01); *F16L 37/26* (2013.01)

(58) Field of Classification Search
CPC ........... F16L 33/32; F16L 47/20; A47L 9/242; A47L 9/248
See application file for complete search history.

(56) References Cited

U.S. PATENT DOCUMENTS

| | | | |
|---|---|---|---|
| 846,905 A * | 3/1907 | Bruen | A47L 9/242 |
| | | | 285/379 |
| 964,579 A | 7/1910 | Stephens | |
| 1,509,484 A | 9/1924 | Powell | |
| 1,940,244 A * | 12/1933 | Carlstedt | A47L 9/242 |
| | | | 15/327.7 |
| 3,338,597 A | 8/1967 | Mason | |
| 3,346,907 A * | 10/1967 | Groves | A47L 9/242 |
| | | | 15/381 |
| 3,781,941 A * | 1/1974 | MacFarland | A47L 9/242 |
| | | | 15/339 |
| 4,400,579 A * | 8/1983 | Nolf | F16L 47/20 |
| | | | 174/DIG. 8 |
| 4,563,790 A * | 1/1986 | Clark | A47L 9/242 |
| | | | 15/337 |
| 4,720,887 A * | 1/1988 | Bosyj | A47L 9/242 |
| | | | 15/351 |
| 5,743,572 A | 4/1998 | Nishio | |
| 5,951,060 A | 9/1999 | Fukano | |
| 8,910,980 B2 | 12/2014 | Neal | |
| 10,393,300 B1 * | 8/2019 | Lane | A47L 9/242 |
| 11,365,838 B1 * | 6/2022 | Lane | F16L 33/32 |
| 2022/0371779 A1 * | 11/2022 | Lane | A47L 9/242 |

* cited by examiner

*Primary Examiner* — Matthew Troutman
*Assistant Examiner* — Fannie Kee
(74) *Attorney, Agent, or Firm* — Favorito Law LLP; Carolyn A. Favorito

(57) ABSTRACT

A bidirectional airflow attachment hose may include an elastomeric connector and a rigid compression fitting having an opening aligned with the opening of the elastomeric connector. Related methods include attaching the bidirectional airflow attachment to a nozzle.

20 Claims, 18 Drawing Sheets

BIDIRECTIONAL AIRFLOW ATTACHMENT HOSE AND METHODS OF USE

This application claims priority from U.S. Provisional Application Ser. No. 63/366,689 which is incorporated herein by reference.

FIELD

The device is in the field of attachment hoses, components thereof, and related methods of use, in particular involving airflow in suctioning devices, such as vacuum cleaners, and blowing devices.

BACKGROUND OF THE INVENTION

U.S. application Ser. No. 15/061,816, which issued as U.S. Pat. No. 10,393,300, U.S. application Ser. No. 16/536,248, which issued as U.S. Pat. No. 11,085,567, U.S. application Ser. No. 17/002,769, which issued as U.S. Pat. No. 11,365,838, U.S. Provisional Application Ser. No. 63/366,690, and the utility application claiming priority thereto, are incorporated herein by reference.

The "Lint Lizard" vacuum hose attachment and other similar products include a funnel shaped connector attached to a hose and are advertised to remove lint from dryer vents and behind hard to reach areas but has received many complaints from customers. In particular, user complaints include the inability for the connector to accommodate typical vacuum cleaner nozzles due to the size of the nozzle, or the shape, such as a nozzle having a female receiver end. In addition, users complained of a poor connection between the connector portion and the hose portion. Further complaints include the flimsiness of the hose, which caused the hose to collapse upon itself during use, the flaccidness of the hose, which caused the hose to roll up instead of remaining stiff enough to be directed to a particular area to be cleaned in a dryer vent, the tendency for lint to get stuck in the hose, the difficulty using extraneous metal wires, burning out the motors of the device to which the hose was attached, and the high-pitched shrieking noise made when attached to a vacuum cleaner when suctioning air through the attachment during use.

There is a need in the art for a bidirectional airflow attachment hose with a self-sealing, easy to affix, slip-on-slip off connector which attaches to a broader range of sizes and shapes of nozzles that may be found, for example, in a single household, for cleaning smaller spaces, which are generally inaccessible when using a larger nozzle or other rigid attachment that typically comes with a suctioning device such, as a vacuum cleaner, or blowing device. In addition there is need in the art to provide a vacuum attachment hose for cleaning difficult to reach places that will not cause unpleasant, high-pitched shrieking noises when air is suctioned through it when in use. In addition there is need in the art to provide a vacuum attachment hose wherein the hose will not collapse upon itself and is flexible enough to maneuver in a dryer vent or lint receptacle. In addition, there is a need in the art for a hose having a connector that does not detach when there is a loss of suction or if the nozzle moves during use, or without the need to change adaptors to accommodate various size nozzles and/or to add flexibility to a rigid end of a nozzle to access hard to reach areas.

In addition, there is a need in the art for an attachment hose that can be attached to various sized air blowing devices, such as leaf blowers, hair dryers, or vacuum cleaners or Shop Vacs that are adapted to blow air from the exhaust, to produce a narrower stream of air and/or to add flexibility to a rigid end of an air blower to access hard to reach areas.

The invention herein solves these and other problems in the art.

SUMMARY

Other features and advantages will be apparent from the following detailed description, the drawings, and the claims.

A bidirectional airflow connector assembly may comprise an elastomeric connector having an opening therethrough comprising a body portion and connector flange portion at a distal end thereof. The connector flange portion may be approximately perpendicular to the body portion. The bidirectional airflow connector assembly may comprise a rigid compression fitting having an opening aligned with the opening of the elastomeric connector. The rigid compression fitting may comprise a female cap, a double sided male component, and an insert having dimensions to fit therebetween. The insert may comprise a tube portion and an insert flange portion. The insert flange portion may be approximately perpendicular to the tube portion. The insert flange portion may be proximate a first end of the insert and may be about the same circumference as the connector flange portion. The tube portion may be proximate a second end of the insert and may have a length that is shorter than a length of the elastomeric connector and may have an outer circumference that may be about the same as an inner circumference of the elastomeric connector. The double sided male component may comprise a male hose end. A proportion of an inner diameter of the tube portion proximate the insert flange portion to a narrowest inner diameter of the male hose end, or a proportion of an inner circumference of the tube portion proximate the insert flange portion to the narrowest inner circumference of the male hose end, may be 2:1 or less, such as about 1:1 to 1.8:1.

In some aspects, the bidirectional airflow connector assembly may have a proportion of a distance between openings in the tube portion to a distance between openings of the elastomeric connector in its resting state of about 0.16:1 to 0.25:1.

In some aspects, a proportion of a wall thickness of the elastomeric connector at the distal end thereof to the distance between openings of the elastomeric connector in its resting state may be about 0.05:1 to 0.12:1.

In some aspects, the first end of the double sided male component that may have an outer circumference that may be larger than an outer circumference of the second end of the double sided male component.

In some aspects, the inner diameter of the tube portion closest to the insert flange portion may be about ⅞" to 1⅛" and the narrowest inner diameter of the male hose end may be about ½ to ¾".

In some aspects, the distance between the openings in the tube portion may be at least 0.3" to about 2"; and the distance between openings of the elastomeric connector may be about 1.5-3.5 inches.

In some aspects, the wall thickness of the elastomeric connector may be about ⅛" to ½"; and the distance between openings of the elastomeric connector may be about 1.5"-3.5".

In some aspects, a bidirectional airflow attachment hose may comprise the bidirectional airflow connector assembly herein and a hose coupled to the male hose end. The distal end of the elastomeric connector in its resting state may have an inner diameter and/or an inner circumference and the first end of the hose may have an inner diameter and/or an inner circumference; and a proportion of the inner diameter of the elastomeric connector at the distal end thereof in its resting state to the inner diameter of the first end of the hose, and/or a proportion of the inner circumference of the distal end of the elastomeric connector in its resting state to the inner circumference of the first end of the hose, may be about 1:1 to 1.5:1.

In some aspects, hose may be more rigid than the elastomeric connector.

In some aspects, the elastomeric connector is cylindrical and a length of the connector is about 1.5 to 3.5 times the inner diameter of the elastomeric connector.

In some aspects, the elastomeric connector of bidirectional airflow attachment hose remains affixed to a vacuum cleaner nozzle if suction is lost or the vacuum cleaner is shut off when in use. In some aspects, the elastomeric connector self seals about peripheries of vacuum cleaner nozzles having either a male terminal end or female terminal end using a single elastomeric connector when in use. In some aspects, the elastomeric connector self seals about peripheries of a cylindrical nozzle and a cuboid nozzle using a single elastomeric connector when in use. In some aspects, the elastomeric connector self seals about peripheries of cylindrical nozzles having an approximately 1" outer diameter and an approximately 3" outer diameter using a single elastomeric connector when in use.

In some aspects, the bidirectional airflow attachment hose comprises an e elastomeric connector that may have a wall thickness of about 1/8" to 1/4", an inner diameter of about 3/4" to 1 1/4", a hose that may have an inner circumference of about 3"-4"; and/or a may have a polyethylene hose having an oblong cross section.

In some aspects, a majority of an internal surface area of the elastomeric connector in its resting state may directly contact an external surface of a nozzle when affixed thereto when in use.

In some aspects, the connector comprises a thermoplastic elastomer that has a durometer hardness Shore Type A value of about 0-10 or Shore Type OO value of about 30-50.

In some aspects, the hose may further comprise a flexible brush proximate the distal end of the hose on an outer surface of the hose.

In some aspects, the hose may further comprise a ridge or lip proximate the distal end of the hose to prevent the brush from slipping off the hose when in use.

In some aspects, a method of using the bidirectional airflow attachment hose may comprise affixing the proximal end of the elastomeric connector to a vacuum cleaner nozzle or a air blowing devices.

DESCRIPTION OF EMBODIMENTS

Figure 1:
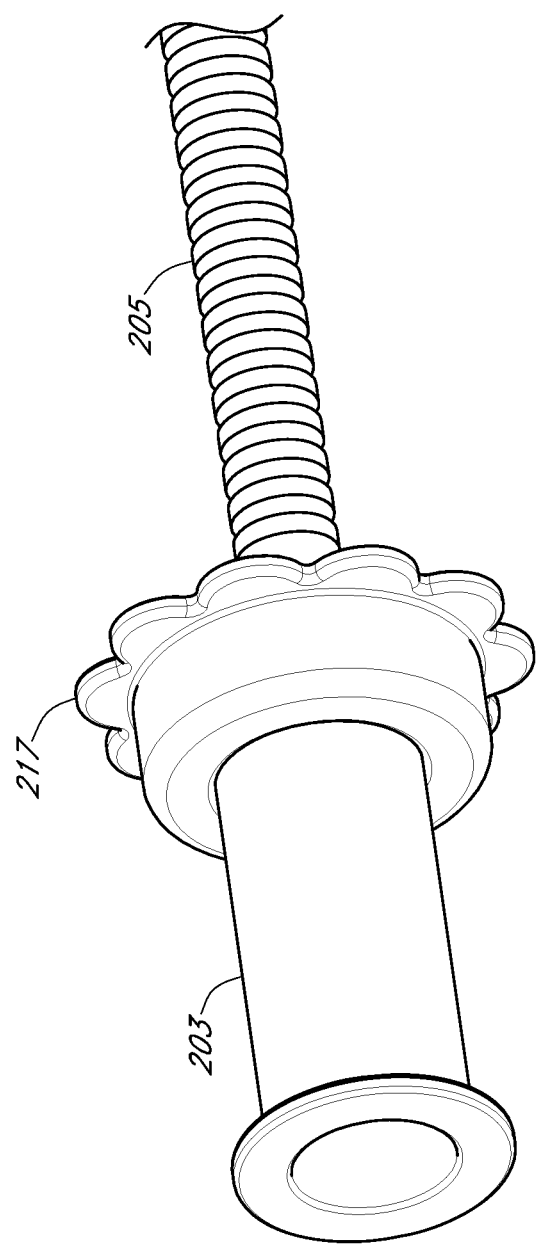
FIG. 1 is an assembled view of an embodiment of a bidirectional airflow attachment hose.
Figure 2B:
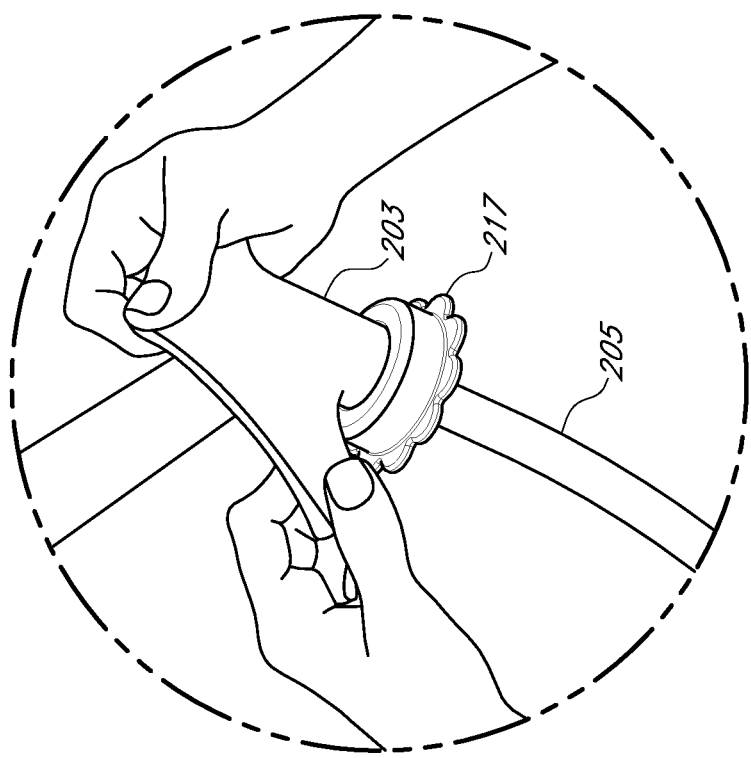
FIGS. 2a-d are a concept infographic of an embodiment of a bidirectional airflow attachment hose comprising an embodiment of assembly herein illustrating how to use the bidirectional airflow attachment hose.
Figure 2A:
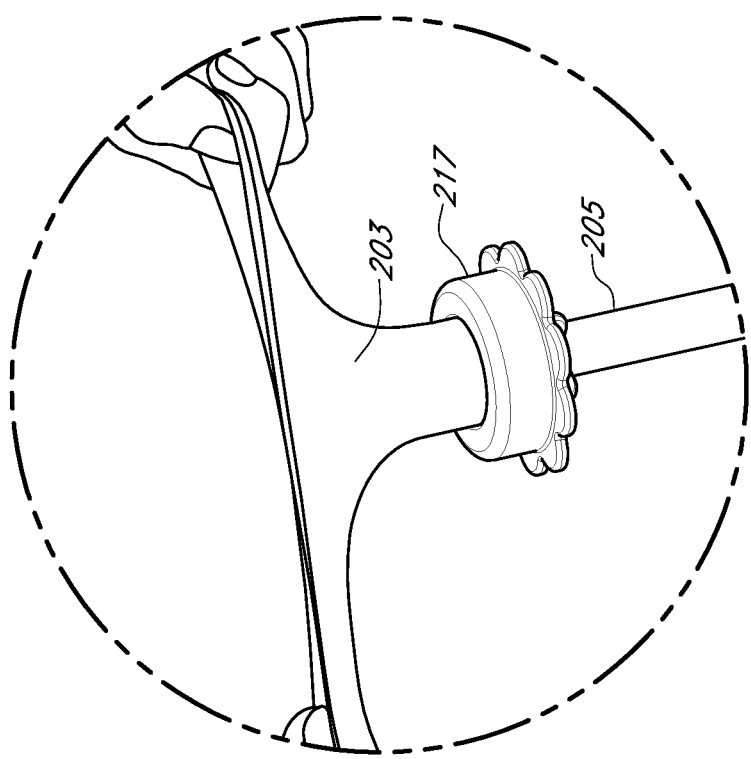
Figure 2D:
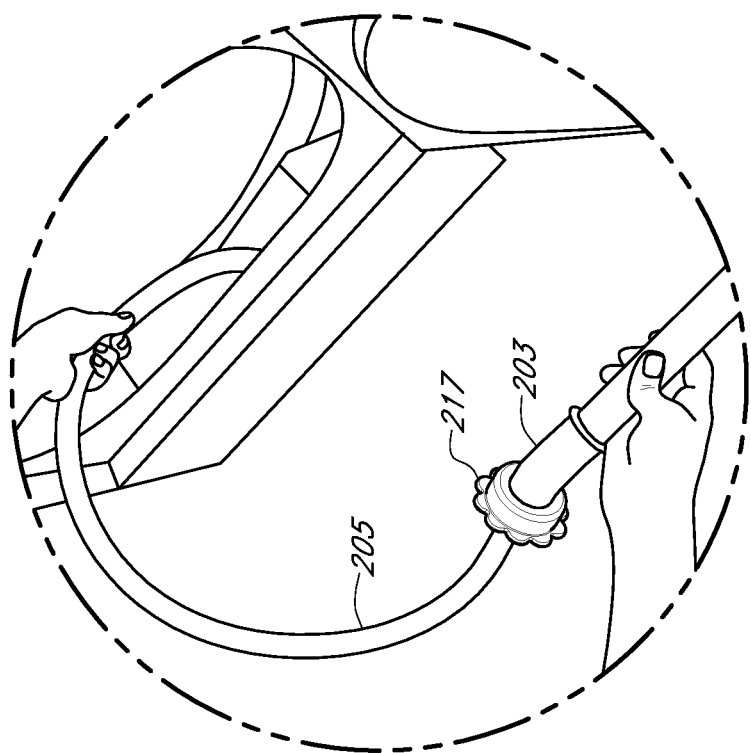
Figure 2C:
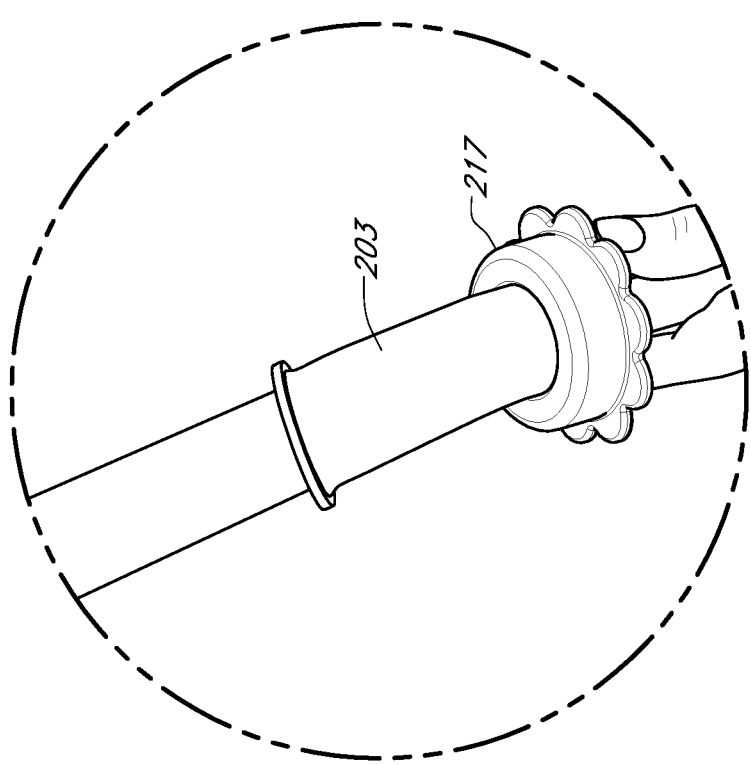
Figure 3A:
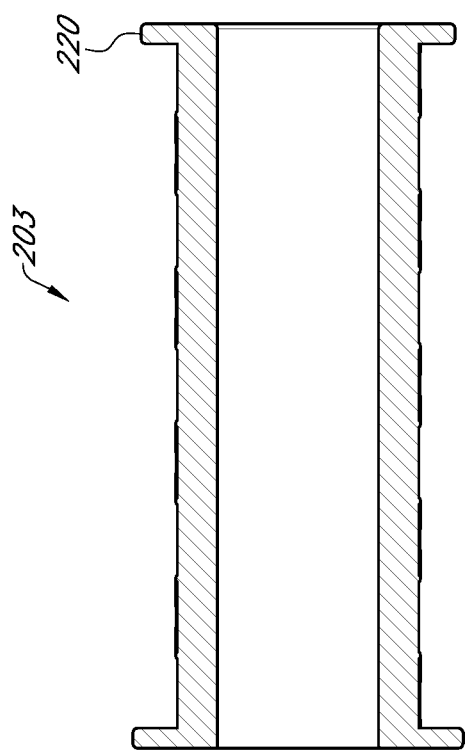
FIGS. 3a-3c are collectively a multiview view including orthogonal views of an embodiment of an elastomeric connector (not drawn to scale).
Figure 3C:
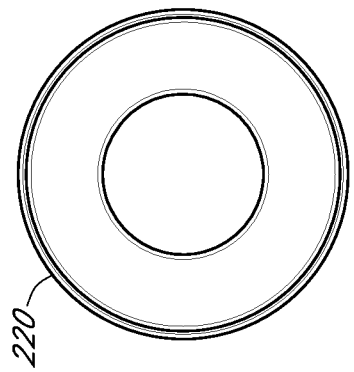
Figure 3B:
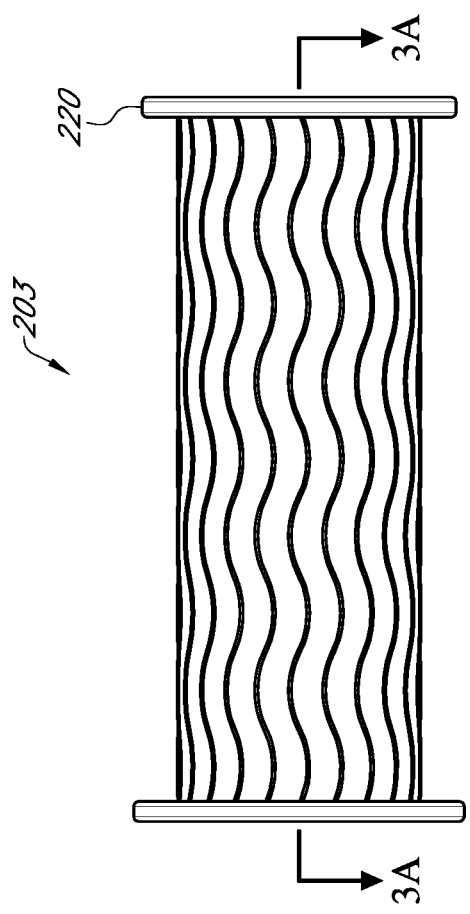

Commercially available vacuum cleaners come in a variety of types, shapes and sizes including an upright vacuums, canisters, handheld vacuums, cordless vacuums, and Shop-Vacs having a variety of suction capabilities, which may be measured in airwatts. An airwatt (AW) is a measurement unit of the effectiveness of vacuum cleaners which refers to airflow and the amount of power (watts) a vacuum cleaner produces and uses. For example, handheld vacuum cleaners may have suction power of about 15 AW, cordless type vacuums may have about 80-100 AW suction power, upright vacuums may have a suction power of about 100-200 AW, canister vacuum cleaners may have 200-300 or more AW, and central vacuum cleaners may have 100-700 or more AW. At higher suction powers, such as over 100 AW such as 100-700, 100-500, 100-400, 100-300 AW, conventional lint dryer attachment hoses may cause a loud shrieking noise, which is a typical complaint with consumers.

Commercially available air blowing devices come in a variety of forms such as leaf blowers, exhausts of vacuum cleaners or Shop Vacs, or hair dryers. Leaf blowers come in a variety of shapes and sizes such as an electric handheld, gas handheld, backpack, or walk-behind leaf blowers. In general, the larger and more powerful a leaf blower's motor or engine, the higher both the blower's airflow (cubic feet per minute, CFM) and speed (miles per hour, MPH) ratings will be. A electric handheld leaf blowers generally have a CFM rating of about 349-605 CFM and a MPH rating of about 95-250 MPH; gas handheld leaf blowers generally have a CFM rating of about 358-460 CFM and a MPH rating of about 145-195 MPH; backpack leaf blowers generally have a CFM rating of about 360-907 CFM and a MPH rating of about 145-251 MPH; and walk-behind leaf blowers generally have a CFM rating of about 1090-8500 CFM and a MPH rating of about 153-200 MPH.

Hair dryers are common blowing devices typically found in households. Handheld hair dryers generally have a barrel end on the terminal portion thereof through which air is blown. Some hood, cap or bonnet type hair dryers have detachable hoses through which air flows. Attachments are generally available to attach to the end of a barrel or nozzle such as a concentrator nozzle or diffuser. Hair dryers are rated based on the power, usually measured in watts and can be from, for example 500-3500 watts, although blowing unheated air may only consume about 70 watts.

In some aspects, the bidirectional airflow attachment hose is useful for the devices' airwatts, watts and CFM/MPH ranges recited herein.

U.S. Pat. Nos. 10,393,300 and 11,085,567 refer to a converter hose that includes a self-sealing connector coupled to a hose, and related methods that include attaching the converter hose to a shower head, faucet or spigot. U.S. application Ser. No. 17/002,769, which issued as U.S. Pat. No. 11,365,838, refers to a connector assembly that couples a relatively more rigid hose with a relatively softer TPE connector. U.S. Pat. Nos. 10,393,300 and 11,085,567. and US U.S. Pat. No. 11,365,838, share the same inventor and are assigned to the same assignee as the present application.

In some aspects, the bidirectional airflow attachment hose does not require or comprise a band, ring or other means to externally compress the walls of the elastomeric connector to the hose. Further, in some aspects, the elastomeric connector does not contain internal ribbing or gasket like protrusions. Thus, in some aspects, the elastomeric connector may omit the internal ribbing or gasket like protrusions that are needed in conventional connectors to accommodate various size and shapes of nozzles yet retain the function of accommodating various size and shapes of nozzles and further providing sufficient gripping on the nozzle to prevent the bidirectional airflow attachment hose herein from detaching from the nozzle during use or if suction ceases. Further, in some aspects, the bidirectional airflow attachment hose eliminates the need to supply additional attachments required by the conventional connector hose to accommodate various sized nozzles, while retaining the function of accommodating various size and shapes of nozzles.

In some aspects, if the elastomeric connector and hose were made from the same elastomeric or other more flexible material, the hose may not be sufficiently rigid, or if the hose did not have a sufficient wall thickness, or the bidirectional airflow attachment hose did not have the connector assembly herein, the hose could collapse when in use with a vacuum cleaner. In some aspects, the bidirectional airflow attachment hose such as the elastomeric connector, compression fitting, connector assembly, and/or hose are easily detachable so that the bidirectional airflow attachment hose could be easily disassembled and a damaged or worn component could be replaced. In some aspects, the hose portion of the bidirectional airflow attachment hose could be extended to make a longer hose.

Aspects of the bidirectional airflow attachment hose herein overcome one or more of these usage, and/or component replacement problems. In some aspects, a bidirectional airflow attachment hose is a self-sealing, slip on-slip off device that may be attached to nozzles such as included with vacuum cleaners, vacuum cleaner attachments, or blowing devices, and related attachments, thus allowing access to hard-to-reach areas in need of vacuuming or blowing, which is lightweight and portable, and wherein a single attachment hose can be used on many different sized and shaped nozzles that may be found in a home such as a central vacuum nozzle, upright vacuum nozzle, handheld vacuum nozzle, a Shop-Vac nozzle (a nozzle for a wet/dry vacuum generally used for heavy duty vacuum projects and which has a larger diameter nozzle than conventional vacuum cleaner nozzles and which also may have a blowing feature using the exhaust), and vacuum cleaners having either male or female ended nozzles. Examples of hard-to-reach areas in need of vacuuming may include in and around dryer lint receptacles, between and under car seats, between and behind couch cushions, vents, light fixtures, keyboards, computers, and inside, around and behind drawers, for example, where the drawers may be full with storage items but dust collect around the inside edges and corners and are in need of cleaning without the need to remove the stored items. In some aspects, the bidirectional airflow attachment hose may be quickly attached to and removed from a nozzle and can be moved to a different sized nozzle or opening where air may enter or exit.

A converter hose marketed as the "Rinseroo" based on the patents and patent applications described above was attempted to be used as a bidirectional airflow attachment hose. See Comparative Example 2 including the dimensions, materials and testing of the Rinseroo converter hose. The Rinseroo converter hose overcame some shortcomings of conventional lint removal hoses. For example, a single stretchy connector hose was able to fit nozzles with either a male or female vacuum nozzle, nozzles having a wide diameter such as a Shop-Vac, and nozzles associated with blowing devices, such as leaf blowers and hair dryers without air escaping the proximal end of the elastomeric connector and without detaching when the nozzle moved or the vacuum cleaner was shut off during use. In addition, the connector assembly can be easily disassembled and reassembled overcoming complaints with regard to conventional lint removing hoses, in which component parts cannot be detached and/or replaced.

However, the Rinseroo converter hose did not overcome all complaints associated with conventional attachments for removing lint from dryer vents. First, in some instances, the Rinseroo converter hose caused a high-pitched shrieking noise when attached to a vacuum nozzle when in use. The sound emanated from proximate both the elastomeric connector portion and the hose portion. In addition, during use while vacuuming, lint from dryer vents and lint receptacles, lint would get stuck in the hose and was difficult to remove from the hose. Further, although the elastomeric connector would accommodate various sized nozzles, the length of the elastomeric connector on the Rinseroo converter hose made it difficult to position the elastomeric connector on a typical nozzle without the elastomeric connector collapsing in the space between the nozzle and the elastomeric connector assembly during vacuuming.

When in use, the bidirectional airflow attachment hose may be attached to a vacuum cleaner nozzle, and when turned on, the air flows inwardly from the distal end of the bidirectional airflow attachment hose opening towards the vacuum cleaner nozzle. In contrast, when the Rinseroo converter hose is attached to a shower head, faucet or spigot and the water is turned on, water flows outwardly. That is, in some aspects, the flow is in the opposite direction as the Rinseroo converter hose. In addition, the properties of water and air are different, for example, air is compressible. Thus, selecting and combining variable parameters, such as various dimensions, to achieve a desired result with respect to water flow differs from selecting and combining variable parameters to achieve a desired result with respect to air flow.

Further, generally, water is about 50 times more viscous than air at normal temperatures, and therefore the flow rate for air is higher than water. Thus, in some aspects, a relatively shorter connector hose is also suitable if the elastomeric connector is attached to an air blowing device that blows air outwardly, such as a leaf blower or a hair dryer, or if a vacuum cleaner was converted to an air blower by attaching its hose to the vacuum's exhaust.

In some aspects, the combination of selected variables achieve one or more unexpectedly beneficial results, such as, avoiding unpleasant or loud shrieking noise when in use, staying affixed to the nozzle when the elastomeric connector is moved or suction is lost, preventing the elastomeric connector from collapsing onto itself, a single connector accommodating a broader range of various sized and shaped nozzles while staying affixed to the nozzle when the elastomeric connector is moved or suction is lost or the device is powered down, avoiding clogging with lint, avoiding kinking of the hose, having the ability to direct the hose to reach hard-to-reach areas without the hose collapsing or rolling up without the use of extraneous wires to provide stiffness, and/or disassembling the attachment hose to exchange or replace the hose for individualized projects.

Moreover, the bidirectional airflow attachment hose herein provides a user with a self-sealing, easy to affix, slip-on-slip off connector which can access areas that are otherwise inaccessible using a relatively larger nozzle or other rigid attachment that typically comes with a vacuum cleaner or blowing device, and is flexible enough to maneuver in a dryer vent or lint receptacle or an area in need of blowing. In addition, the bidirectional airflow attachment hose herein has a connector having an internal surface that removably adheres to a nozzle, e.g., on a vacuum cleaner or blowing device so that the elastomeric connector does not detach when there is a loss of suction, if air is blown in either direction (into the device or away from the device, or if the nozzle moves during use).

In addition, hoses of various dimensions and materials were tested and hoses were selected that were sufficiently inflexible such that directing the hose in small openings such as dryer openings that contain a lint trap to avoid the hose rolling up, and to prevent collapsing in on itself during use when applying suction of a vacuum cleaner, but sufficiently flexible to accommodate various openings and vents in different model dryers.

Various proportions of various elements were selected and combined to reduce the noise, clogging flexibility and versatility issues with the Rinseroo converter hose (see Comparative Example 1) and conventional dryer vent attachment hoses. In some aspects, various dimensions of the elastomeric connector, portions of the compression fitting, and hose were selected and combined to achieve the results needed for a bidirectional airflow attachment hose to be attached to nozzles of various sizes without the problems associated with conventional hose attachments such as those used to clean dryer vents.

In some aspects, the proportion of the inner diameter (or inner circumference) of the elastomeric connector e.g., closest to the hose, and in its resting state to the inner diameter (or inner circumference) of the hose unexpectedly avoided problems in the art, such as reducing and/or eliminating the high-pitched shrieking noise, staying affixed to the nozzle when the elastomeric connector is moved or suction is lost, reducing and/or eliminating the issue of the elastomeric connector collapsing onto itself, reducing and/or eliminating the burning smell from the devices' motors overworking, or reducing and/or eliminating the clogging issue. The proportion of the inner diameter (or inner circumference) of the elastomeric connector at the distal end to the inner diameter (or inner circumference) the hose may be 1.5 (i.e., 1.5:1 or 1.5" internal diameter/circumference of the elastomeric connector to 1" internal diameter/circumference of the hose) or less, such as in the range of proportions of about 1-1.5, 1-1.4, or 1.3-1.4, for example 1, 1.1, 1.2, 1.3, 1.4 or 1.5. For instance, the proportion of the inner diameters (or inner circumferences can also be used) of 1" of the elastomeric connector and of 0.75" of the hose is about 1.3. In another example, the proportion of the inner diameters (or inner circumferences can also be used) of ⅞" diameter of the elastomeric connector at the distal end and of 0.75" of the hose is about 1.2. In contrast, the proportion of the inner diameter (or inner circumference) of the elastomeric connector to the inner diameter (or inner circumference) of the hose of the Rinseroo converter hose is about 2 (i.e., 1" diameter of connector to 0.5" diameter of the hose).

In some aspects, the inner diameter of the portion of the elastomeric connector in its resting state closest to the hose may be about ¾" to 2", ¾" to 1.5", ¾" to 1.25" " or about 1" or 15/16".

In some aspects, when a compression fitting is used, the proportion of the inner diameter (or inner circumference) of the tube portion of the insert to the inner diameter (or inner circumference) of the opening of the male end that inserts into or attaches to the hose end unexpectedly avoided problems in the art, such as, reducing and/or eliminating the high-pitched shrieking noise, reducing and/or eliminating the issue of the elastomeric connector collapsing onto itself, reducing and/or eliminating the burning smell from the devices' motors overworking, and/or reducing and eliminating the clogging issue. The proportion of the inner diameter (or inner circumference) of the tube of the insert to the inner diameter (or inner circumference) of the opening in the male end that inserts into the hose end may be about 2 or less, such as in the range of about 1-2, 1-1.9, 1-1.8, 1-1.7, 1-1.6, 1-1.5, 1-1.4, 1-1.3, 1-1.3, 1-1.1, for example 1, 1.1, 1.2, 1.3, 1.4, 1.5 1.6, 1.7, 1.8, 1.9 or 2. For example, the inner diameter of the tube of the insert of 1" to the inner diameter of the opening of the male end that inserts into the hose ⅝" has a proportion of about 1.6, the inner diameter of the tube portion of the insert of 0.95" to the inner diameter of the opening of the male end that inserts into the hose of ¾" has a proportion of about 1.5, and the inner diameter of the tube portion of the insert of ⅞" to the inner diameter of the opening of the male end that inserts into the hose of ¾" has a proportion of about 1.2. In contrast, the proportion of the inner diameter (or inner circumference) of the tube portion of the insert to the inner diameter (or inner circumference) of the opening of the male end that inserts into or attaches to the hose end of the Rinseroo converter hose is about 2.3 (i.e., the inner diameter of the tube of the insert of about 1" to the inner diameter of the opening of the male end that inserts into the hose of about 7/16").

In some aspects, the inner diameter of the tube portion closest to the insert flange may be about ¾" to 2", ¾" to 1.5", ¾" to 1.25", Jul. 8, 2016" to 17/16" or about 1", about 15/16" or about ⅞".

In some aspects, the proportion of the wall thickness of the elastomeric connector at an end closest to the hose (excluding the flange) to the length of the elastomeric connector in its resting state unexpectedly avoided problems in the art. For example, the proportion of the wall thickness of the elastomeric connector to the length of the elastomeric connector is about: 0.05-0.12. (i.e., 0.05:1 to 0.12:1), such as about 0.05-0.1, 0.05-0.09, 0.05-0.08, 0.05-0.7, 0.06-0.1, 0.06-0.09, 0.06-0.08, 0.06-0.07, 0.07-0.1, 0.07-0.09 or about 0.050, 0.06, 0.07, 0.08 or 0.09. For example, the wall thickness of the elastomeric connector of about 3/16" (about 0.19") to length of a 3" connector is about 0.06, and the wall thickness of the elastomeric connector of about 0.236" (6 mm) to length of a 3" connector is about 0.08. In contrast, the proportion of the wall thickness of the elastomeric connector to the length of the elastomeric connector of the Rinseroo converter hose is about 0.04 (i.e., about 0.19" wall thickness of the elastomeric connector to 4.5" of the elastomeric connector).

In some aspects, the wall thickness of the elastomeric connector in its resting state is about 1/8" to 1/2", 3/16" to 1/2", 3/16" to 1/4", 1/4" to 1/2" or 1/4" to 3/8" thick such as 3/16", or 1/4" or 6 mm.

In some aspects, when a compression fitting is used, the proportion of the length (height) of the tube portion of the insert (i.e., measured using the distance of the insert from one opening to the other) to the length of the elastomeric connector in its resting state (i.e., distance between openings in the elastomeric connector) unexpectedly avoided problems in the art. The proportion of the length of the tube to the length of the elastomeric connector. For example the proportion of the length of the insert 215 to the length of the elastomeric connector 203 is about: 0.16-0.25, (i.e., 0.16:1 to 0.25:1) such as about 0.16-0.22, 0.16-0.21, 0.17-0.22, 0.17-0.21, 0.17-0.2, 0.17-0.19, or 0.18-0.21, or about 0.16, 0.17, 0.18, 0.19, 0,2, 0.21, 0.22, 0.23, 0.24, or 0.25. For example, the length of the tube of the insert of about 0.5" or 0.56" to length of a 3" connector is about 0.17 or 0.18 respectively. In contrast, the proportion of the length of the tube of the insert to the length of the elastomeric connector of the Rinseroo converter hose is about 0.12 (i.e., 0.56" length of tube to 4.5" of the elastomeric connector).

In some aspects, the length of the tube portion of the insert (i.e., the height of the insert or the distance of the insert from one opening to the other) may be about 0.3"-2", 0.4"-2", 0.4"-1.5", 0.4"-1", 0.4"-0.9", 0.4"-0.6" or about 0.5".

In some aspects, the length of the elastomeric connector (i.e., the distance from one opening to the other) unexpectedly avoided problems in the art, such as, reducing and/or eliminating the high-pitched shrieking noise and reducing and/or eliminating the issue of the elastomeric connector collapsing onto itself when suction was applied by the vacuum when in use. For example, an approximately 1.5"-3.5" length connector such as 2.5-3.5", or about 3" length connector allowed the elastomeric connector to be properly fitted to a nozzle such that it reduced and/or eliminated the issue of the elastomeric connector collapsing onto itself causing high-pitched, shrieking noise when applying suction from a vacuum cleaner. In addition, in some aspects, the length of the connecter is appropriate for vacuum cleaner nozzles as the elastomeric connector need not accommodate the vast differences among water fixtures, because nozzles and their associated attachments, which, although shaped differently, generally have circumferences spanning a narrower range than, for example, shower heads, faucets and spigots. Thus in some aspects, with a shorter connector, there is sufficient internal surface area to self seal about most conventional nozzles and there is no pull from a water flowing, e.g., in the opposite direction as air flows, through the hose that may require additional internal surface area of the elastomeric connector. In addition, regarding blowing devices, air is less viscous than water, and therefore air flows through the bidirectional airflow attachment hose more easily allowing a shorter connector to be used. In some aspects, using a relatively longer elastomeric connector with conventional vacuum nozzles may have excess slack in the elastomeric connector, due to the difficulty getting the entire length of connector on the nozzle, which in turn causes slack in the elastomeric connector in the space between elastomeric connector and the hose that may cause a shrieking noise.

Thus, the proportions of the original converter hose were not simply uniformly increased in size to make the bidirectional airflow attachment hose. Rather, various dimensions were selected in particular proportions to make the bidirectional airflow attachment hose herein.

The attachment hose herein may be used with conventional household suctioning devices, such as vacuum cleaners, and blowing devices, but it is also expected to be useful with other suctioning systems and blowing systems, and thus a reference to suctioning device, vacuum cleaner or blowing device is intended to encompass similar uses with other applications and systems.

In some aspects, the bidirectional airflow attachment hose is comprised of a thermoplastic elastomer connector having a proximal end and a distal end; wherein, when in use, the proximal end self-seals about a periphery of an existing nozzle and allows air to flow through the nozzle and the elastomeric connector; wherein the distal end is coupled to a first end of a hose.

In some aspects, the bidirectional airflow attachment hose further comprises a hollow nozzle attachment, such as one that is coupled to a second end of the hose.

A method of using the bidirectional airflow attachment hose herein, as exemplified in FIG. 2 may comprise attaching the proximal end of the elastomeric connector to a nozzle. The method may further comprise suctioning or blowing air through the bidirectional airflow attachment hose by using a vacuum or blowing device wherein the elastomeric connector self-seals about the periphery of the nozzle during the suctioning or blowing step.

A method may further include rolling down the proximal end of the elastomeric connector 203 over itself so it can fit a nozzle, e.g., with a smaller circumference than the elastomeric connector.

In some aspects as seen in the figures herein, the bidirectional airflow attachment hose in FIG. 1 includes a self-sealing, slip on slip off, connector 203, and a flexible hose 205 that may be used with an existing nozzle as illustrated in FIG. 2 using a vacuum cleaner nozzle. In one embodiment, a self-sealing, slip on connector 203 comprises a hollow, extremely flexible tube shaped member for receiving a nozzle. The self-sealing connector 203 is comprised of a self-sealing, extremely stretchy, flexible and durable material such as a flexible thermoplastic elastomer, that returns to its original shape when no longer in a stretched position.

The self-sealing connector 203, has a proximal end and a distal end. The self-sealing connector 203 may be attached, for example, to a vacuum cleaner nozzle by stretching and sliding the proximal end of the elastomeric connector, over a nozzle such as the vacuum cleaner nozzle as illustrated in FIG. 2.

In some embodiments, a "self-sealing" connector is sufficiently flexible and has sufficient memory such that the elastomeric connector does not require a clamping means, securing means, connecting means, or other mechanical means such as a ring clamp, clip, clasp, grip, a vise, a fastener, an additional flexible band, or a threaded female coupler connected to a male coupler on a nozzle, to secure the elastomeric connector to an existing vacuum cleaner nozzle or blowing device when in normal use, while preventing a substantial amount of air to escape the proximal end of the elastomeric connector during use. Thus, in some aspects, the bidirectional airflow attachment hose omits the clamping, securing or connecting means at the proximal end, which may prevent the hose from slipping off the nozzle and presumably prevent air leakage proximate the open end of the elastomeric connector, while retaining the function of leakage prevention and lack of slippage. In some embodiments, preventing a substantial amount of air means less than 10% of the amount of air from the source, such as less than 8%, 5%, 2% of the amount of air from the source, or none or almost none of the air, escapes during use, for example when the air is flowing at a typical airflow of a household vacuum or blowing device. In some aspects, no air or almost no air such as less than 1%, 0.1%, or 0.01% of the air flowing through the bidirectional airflow attachment hose escapes the proximal end of the elastomeric connector when in use, or all or substantially all of the air passes through the distal end of the elastomeric connector to the hose.

Without being bound by theory, it appears that the self-sealing connector, when in use, allows the flow of air through the elastomeric connector that forms a seal about the periphery of a nozzle, while the elastomeric connector concomitantly has sufficient elastomeric properties to directly contact and grip a larger percentage of the nozzle's surface area that is lacking in other, more rigid conventional connectors, which may be unable to grip such a large surface area on nozzles of varying sizes, and cause the conventional connector to detach from the nozzle. In some aspects, the length of the elastomeric connector that directly contacts a nozzle when in use (see e.g., FIG. 2) is at least about 80% of the length in its resting state from the center of an opening on the proximal end to the center of the opening of the distal end of the elastomeric connector (excluding the length of the elastomeric connector where the insert, if present, rests in its resting state), such as at least about 85%, 90%, 95% or 100% (see e.g., FIG. 2 showing at least 90% of the elastomeric connector in the resting state directly contacts the vacuum cleaner nozzle when in use). In some aspects, the elastomeric connector does not have an additional part such as a gasket like protrusion(s) situated between the elastomeric connector and the nozzle when in use, thus allowing direct contact and self-sealing of the elastomeric connector around a nozzle when in use.

In some embodiments, the elastomeric connector comprises a thermoplastic elastomer or any other material or mixture of materials that has similar properties. Some materials have been referred to as "super elastic plastic." In some aspects, thermoplastic elastomers (TPEs) may comprise polymers or copolymers or blends of thereof that are formulated to provide the properties outlined below. For instance, TPEs may contain block copolymers such as styrene based block copolymers including styrene-ethylene, butylene-styrene block copolymers, styrene-ethylene, propylene-styrene block copolymers, styrene-ethylene, propylene block copolymers, styrene-ethylene, ethylene propylene-styrene block copolymers, partially hydrogenated products of styrene-isoprene, butadiene-styrene block copolymers, styrene-butadiene-styrene block copolymers, or styrene-isoprene-styrene block copolymers, or a combination thereof. Thermoplastic urethanes also may be useful and may be formulated to provide appropriate properties. In some aspects, TPEs may contain a styrene butadiene styrene block copolymer or styrene ethylene butadiene styrene block copolymers.

In some aspects a single TPE connector can be stretched a sufficient amount to accommodate various size nozzles, yet after being fitted on the nozzle, the elastomeric connector will have elastomer properties such that upon contraction, the elastomeric connector self-seals about a periphery of the nozzle, and when removed the elastomeric connector may return to its resting shape. In some aspects, a single connector could accommodate a range of nozzles that are at least twice the size relative (such as twice, three time or four times the diameter or circumference) to the other, for example, 2-20 times the size relative to another such as 2-10, 2-5, 2-3, 4-16, 3-8, or 5-8 times the size relative to another, although generally 2-4× is sufficient for the bidirectional airflow attachment hose. Thermoplastic elastomers or super elastic plastics are commercially available under trade names such Kraton® D2104, Dynaflex® G6713-001, Dynaflex® G6713C. Versaflex® OM9-802CL or Versaflex® CL2000X. Some or all commercial TPEs are proprietary polymers or copolymers, or blends thereof having proprietary formulations containing components such as crosslinking agents or additives, which affect the properties identified below. TPE suppliers may readily provide materials based on one or a combination of the properties below. In some aspects, a combination comprising primarily about 75% by weight Kraton® G1651 H, a clear, linear copolymer based on styrene and ethylene/butylene (with a polystyrene content of about 33%) and about 25% by weight Kang Libo 15 #white oil cosmetic product are used to make the TPE connector, and secondarily, from a weigh perspective, propriety additives and dyes. The white oil lends properties to the combination making the resulting material less hard than the Kraton® G1651 H while providing similar strength and elasticity Kraton® G1651 H. For example, Kraton® G1651 H has a hardness of Shore Type A using ASTM 2240 at 10 seconds at 23° C. of 60, which may prove too hard to use as the only component for making the TPE connector. The tensile strength of Kraton® G1651 H is less than about 5.5 and the elongation at break is less than 800%, which are both in range for the material used for making the final TPE connector herein. In addition, the material in Examples 1 or 2 may be used.

In some aspects, the super elastic plastic or thermoplastic elastomer may have a tensile stress at least in one direction measured according to ASTM D412 at 100% strain or 300% at 23° C. of less than about 15 MPa, such as about 0.01-10 MPa, about 0.05-5 MPa or about 0.05-3 MPa. Tensile stress of the same material may have lower values at 100% strain versus 300% strain. In some aspects, tensile stress at 100% strain at 23° C. may be less than about 10 MPa, such as about 0.01-5 MPa, about 0.03-1.5 MPa, or about 0.06-1.5 MPa, such as about 0.1, 0.2, 0.3, 0.4, 0.5, 0.6, 0.7, 0.8, 0.9, 1.0, 1.1, 1.2, 1.3, 1.4, or 1.5 MPa, such as 0.18 MPa. Alternatively, in some aspects tensile stress at 300% strain at 23° C. may be about 0.1-10 MPa, about 0.1-5 MPa, about 0.1-3 MPa, about 0.1-1 MPa, about 0.2-0.7 MPa, about 0.3-0.6 MPa or about 0.4-0.5 MPa, such as about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0 MPa, or any range among these values, such as about 0.46 MPa.

In some aspects, the tensile strength of the super elastic plastic or thermoplastic elastomer at least in one direction at break measured according to ASTM D412 at 23° C. may be about 0.1-15 MPa, such as from about 0.1-10, 0.5-5, 0.5-8, 1-8, 1.1-2.2, 1.2-2.1, 1.3-2, 1.4-1.9, or 1.5-1.8, MPa, and typically have a value of about 0.5, 1, 2, 3, 4, 5, 6, 7, 8, 9, or 10 MPa, or any range among these values. In some aspects, the tensile strength is about 1.0-2.0 Mpa such as 1.0, 1.1, 1.2, 1.3, 1.4, 1.5, 1.6, 1.7, 1.8, 1.9, or 2.0 Mpa, such as 1.5 MPa or 1.8 Mpa.

In some aspects, the tensile elongation of the super elastic plastic or thermoplastic elastomer at least in one direction at break measured according to ASTM D412 (or ASTM D-638) at 23° C. may be 50% or greater such as about 100%-5000%, about 200%-3000%, about 300%-2000%, or about 500%-1500%, or about 500%, 600%, 700%, 800%, 900%, 1000%, 1100%, 1200%, 1300%, 1400%, or 1500%, or any range among these values. In some aspects, the tensile elongation is about 660% to break.

In some aspects, the tear strength of the super elastic plastic or thermoplastic elastomer measured according to ASTM D624 is about 1-35 kN/m, such as about 1-5 kN/m or 3-27 kN/m, about 5-10 kN/m, such as about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, or 35 kN/m, or any range among these values.

In some aspects, the stress at break of the super elastic plastic or thermoplastic elastomer measured according to ASTM D2240 may be about 1-35 kN/m, such as about 3-27 kN/m, about 5-10 kN/m, such as about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, or 35 kN/m, or any range among these values.

In some aspects, the durometer hardness Shore Type A or Shore Type OO of the super elastic plastic or thermoplastic elastomer measured according to ASTM D2240 for 10 seconds at 23° C. may have a value of about 0-50, such as about 0-45, about 2-40, or about 3-15 such as about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40, or any range among these values. For example, the Shore Type A durometer hardness may be about 0-1 such as 0, or the Shore Type OO may be about 35-45 such as about 40.

In some aspects, the density of the super elastic plastic or thermoplastic elastomer measured according to ASTM D2240 or ASTM D792 may be about 0.01-5 g/cm3, about 0.5-2 g/cm$^3$, or about 0.8-1.5 g/cm$^3$, such as about 0.8, 0.9, 1.0, 1.1, 1.2, 1.3, 1.4, 1.5, 1.6, 1.7, 1.8, 1.9, or 2.0 g/cm$^3$, or any range among these values.

In some aspects, the shrinkage of the super elastic plastic or thermoplastic elastomer measured according to ASTM D2240 may be about 0.01-5%, about 0.5-2%, or about 0.8-1.5%, such as about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0%, or any range among these values.

In some aspects, the melt flow of the super elastic plastic or thermoplastic elastomer measured according to ASTM D2240 may be about 25-150 g/10 min, such as about 50-100 g/10 min, about 75-95 g/10 min, such as about 75, 76, 77, 78, 79, 80, 81, 82, 83, 84, 85, 86, 87, 88, 89, 90, 91, 92, 93, 94, 95, 96, 97, 98, 99, or 100 g/10 min, or any range among these values.

In some aspects, the melt flow of the super elastic plastic or thermoplastic elastomer measured according to ASTM D2240 may be about 25-150 MPa, such as about 50-100 MPa, about 75-95 MPa, such as about 75, 76, 77, 78, 79, 80, 81, 82, 83, 84, 85, 86, 87, 88, 89, 90, 91, 92, 93, 94, 95, 96, 97, 98, 99, or 100 MPa, or any range among these values.

In some aspects, the compressive strength of the super elastic plastic or thermoplastic elastomer measured according to ASTM D2240 may be about 1-50%, such as about 1-45, about 2-40, or about 3-30 such as about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, or 45% or any range among these values.

In some aspects, the brittle temperature of the super elastic plastic or thermoplastic elastomer measured according to ASTM D2240 may be about −80 to −50° C., such as about −75 to −55, about −72 to −58 or about −75, −74, −73, −72, −71, −70, −69, −68, −67, −66, −65, −64, −63, −62, −61, −60, −59, −58, −57, −56, −55, −54, −53, −52, −51, or −50° C. or any range among these values.

The super elastic plastic or thermoplastic elastomer may have one or more of the properties above (e.g., tensile stress, tensile strength, tear strength, tensile elongation, or durometer hardness), such as one or more of tensile strength, tensile elongation and durometer hardness.

In some aspects, the elastomeric connector, compression fitting, hose and other attachments related to the bidirectional airflow attachment hose is made from materials that can withstand temperatures of a nozzle such as about 100-150° F. while maintaining the self-sealing attributes of the elastomeric connector without deforming the bidirectional airflow attachment hose.

The length of the elastomeric connector may be sufficiently long to accommodate various shaped nozzles in its expanded state, yet be short enough to prevent shrieking noise when in use. The length may be, for example, from about 1-3.5 inches such as about 2-3.5 inches, about 2.5-3 inches, or about 3 inches in length in its resting state.

The elastomeric connector, such as the TPE or super elastic plastic connector, in some aspects, may have a wall thickness of about ⅛" to ½" thick such as about ⅛" to ¼" thick, for example, about ¹⁄₁₆", ⅛", ³⁄₁₆" or ¼", e.g., ⅛" thickness. In some embodiments the wall thickness of the elastomeric connector is 6 mm (0.236"). In its expanded state, the elastomeric connector may stretch in any direction (e.g., horizontally, vertically, diagonally, lengthwise, widthwise, circumferentially, etc.) in which it is expanded about 2-20 times, such as about 4-16 or about 8-10 times, in comparison to the resting state dimensions, allowing a connector having a fixed size to accommodate various size nozzles, such as those in Example 1. By any direction e.g., horizontally, vertically, diagonally, lengthwise, widthwise, or circumferentially, refers to stretching the entire connector e.g., from one end to another lengthwise, from side to side widthwise, from corner to corner diagonally, or outwardly from a diameter circumferentially, etc. When in a stretched state, for example, when fitted to an existing nozzle, the elastomeric connector may have a dimension such as a diameter of a cylindrical connector at its widest part of about 0.5-10 inches, for example 1-10, 1-8, 1-5, 1-3, 2-5 or 2-3 inches. For example, the inner or outer diameter of a cylindrical connector may be about 0.25-10 inches, about 0.5-5 inches, or more typically for conventional home vacuum cleaners or blowing devices, about 0.5-2 inches, about 0.5-1.5 inches, 0.75-1.25" or may be about 1 inch. Other shaped elastomeric connectors may have similar inner or outer dimensions from one side to the other side of the elastomeric connector, for example, between facing sides of a cuboid or prism. Some nozzles are cylindrical and are roughly 1"-2" in diameter. Thus, the inner diameter of a cylindrical connector may be about 0.25"-2" inches, about 0.5-1.5 inches, about 0.75"-1.25 inches, or may be about 1". Some nozzles have a relatively short rigid nozzle part and a short accordion hose portion that make attaching to a conventional lint hoses such as those described in Comparative Examples 1a-1c untenable. When the rigid part is inside the funnel shaped portion of a conventional lint hose (e.g., according to the vacuum cleaner in Comparative Examples 1a-1c), it is difficult or impossible to hold the accordion portion in the funnel portion without it moving so that suction can be maintained. Often suction is broken and the nozzle detaches from the funnel portion. In addition, conventional lint hoses may not fit to nozzles terminating in a female opening, in which male attachments may be inserted, as the shape of the female end does not fit into the funnel portion of conventional lint hoses. The bidirectional airflow attachment hose herein has properties and dimensions such that a single bidirectional airflow attachment hose can accommodate short rigid and accordion hose nozzles and male and female ended nozzles. For example, a single elastomeric hose is flexible enough and can sufficiently retract such that it can fit a variety of nozzles, e.g. a cuboid and cylindrical nozzle. Based on the exemplary nozzles herein, if a particular application, for example not for typical home use, required a larger elastomeric hose, for example if the nozzle in need of a bidirectional airflow attachment hose was larger than the stretching capacity of the elastomeric connector for a typical household suctioning or blowing device, the elastomeric connector, and the bidirectional airflow attachment hose, can be manufactured proportionally larger to accommodate a variety of larger nozzles, e.g. a cuboid and cylindrical nozzle.

The elastomeric connector may have similar sized openings on either end or the distal end may be narrower than the proximal end, such as wherein the elastomeric connector may have, at least partially, a funnel or conical shape, although the elastomeric connector may be formed in any suitable shape such as cylindrical, spherical, barrel shaped or prism shaped, rectangular prism, arbitrarily shaped or variations thereof that will accommodate a nozzle of various sizes and shapes.

In some aspects of the bidirectional airflow attachment hose herein, the distal end of the elastomeric connector is coupled to the first end of the hose, for example, with a clamp. Aspects of the bidirectional airflow attachment hose of FIGS. 1-11, comprise a coupler/compression fitting 217 (a combination of 212, 213, and 215) between the flexible hose 205 and the self-scaling connector 203. The self-sealing connector 203 may be modified with a connector flange 220 to be used with the coupler/compression fitting 217. The flexible hose 205 has a first end, and a second end. The hose 205 may be made from any material suitable for its purpose that provides strength and structure while retaining flexibility. In some aspects, a typical hose may be made from a flexible material, for example, polyethylene, TPE, vinyl, polyvinyl chloride (PVC), silicone, or latex. The hose may be any suitable length, such about 1'-10' or greater. In some aspects, the hose length may be 1'-5' or 2'-3' feet. In some aspects, the hose is non-metal.

The hose may be formed having any suitable cross section such as a round, oval, square, diamond, rectangular or oblong cross section or variations thereof that are sufficiently flexible so that the hose can be connected to the male hose end, e.g., having a round cross section, or to the elastomeric connector through another means. For example, in one aspect, the hose has an oblong oval cross section to facilitate the hose in accessing slender openings of lint receptacles in conventional clothes dryers while maintaining proportions to avoid problems in the art.

In some aspects, the hose is reinforced, such as with fibers or thickened portions e.g., arranged as a mesh, spirals, or ribs, which may be integral with the flexible material such as PVC, which may provide strength or structure while retaining flexibility. For example, a stiffer hose material with concentric ribs may have more flexibility than a hose of the same material without the ribs. In some aspects, the reinforcement material allows the hose to be moved in the desired direction, such as to collect dust in a dryer vent. In some aspects, a portion of the second end of the hose 205 may have a smooth portion of the hose that is stiffer than the portion on the first end of the hose. In some aspects, the first end of the hose may have a ribbed portion that make the hose flexible, and a second end of the hose that has no ribs and is stiffer, for example, to facilitate directing it down into dryer vents or another area in need of vacuuming. In some aspects, roughly about a third of the hose can have a stiffer portion and ⅔ of the hose may be ribbed. The integrated hose portion and slender portion may be made from the same material and may have a similar wall thickness. For example, the hose may be ribbed to make it flexible, and the slender portion may have no ribs such that it is stiffer than the ribbed portion so it can be directed to aread with a slim opening. In some aspects, the hose comprises polyethylene.

Initially, the same PVC hose as the Rinseroo converter hose with a Shore Type A durometer of about 65 and a wall thickness of about ⅛" except it had a larger diameter of ¾", However, this hose kinked and bent when directing it down the dryer vent. Thus, in some aspects, the hose has a Shore Type A durometer of greater than about 65 such as 70-100 or 70-90, 70-80, 890-90 or 90-100.

In some aspects, the first end of the hose 205 may be connected to an open distal end of the self-sealing connector 203 via a securing means (such as a clamp), or other securing means, but these are unnecessary to achieve self-sealing.

In some aspects, the distal end of the elastomeric connector 203 has a female coupler 212 as shown in FIG. 5 and the first end of the hose has a male coupler 213 as shown in FIG. 6, or the distal end of the elastomeric connector has a male coupler and the first end of the hose has a female coupler (not shown). In some aspects, the male or female coupler may be secured to the elastomeric connector or hose, such as by a clamp or glue or other securing means.

Figure 8:
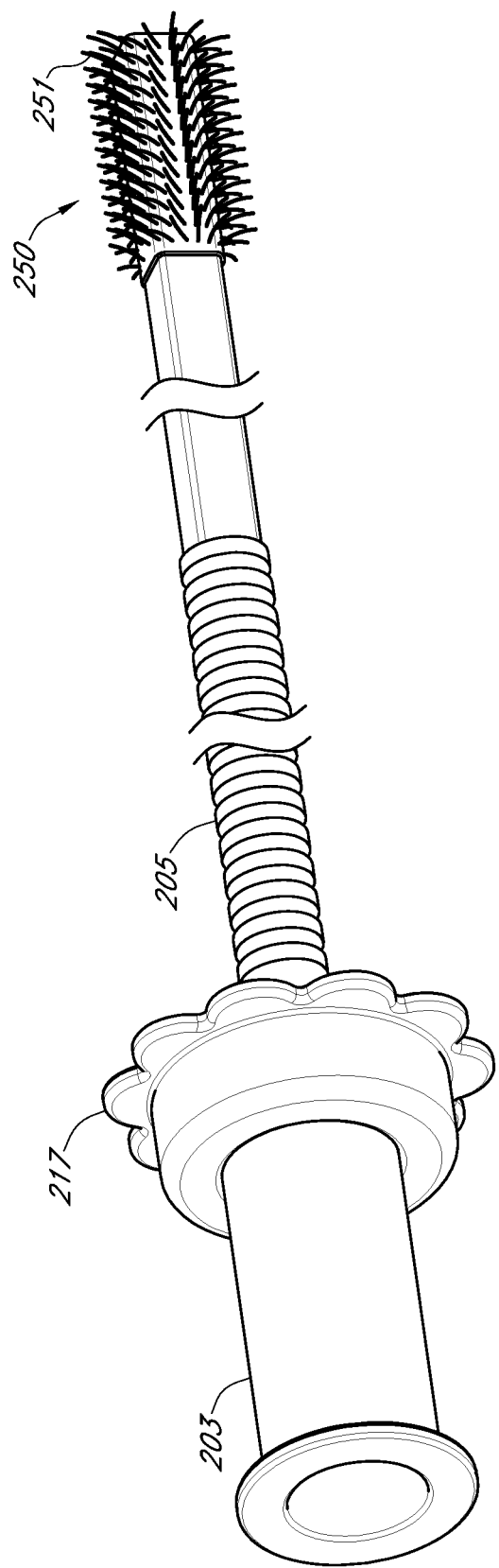
FIG. 8 is an embodiment of a bidirectional airflow attachment hose including a hose having an oblong cross section, and brush attachment.
Figure 9:
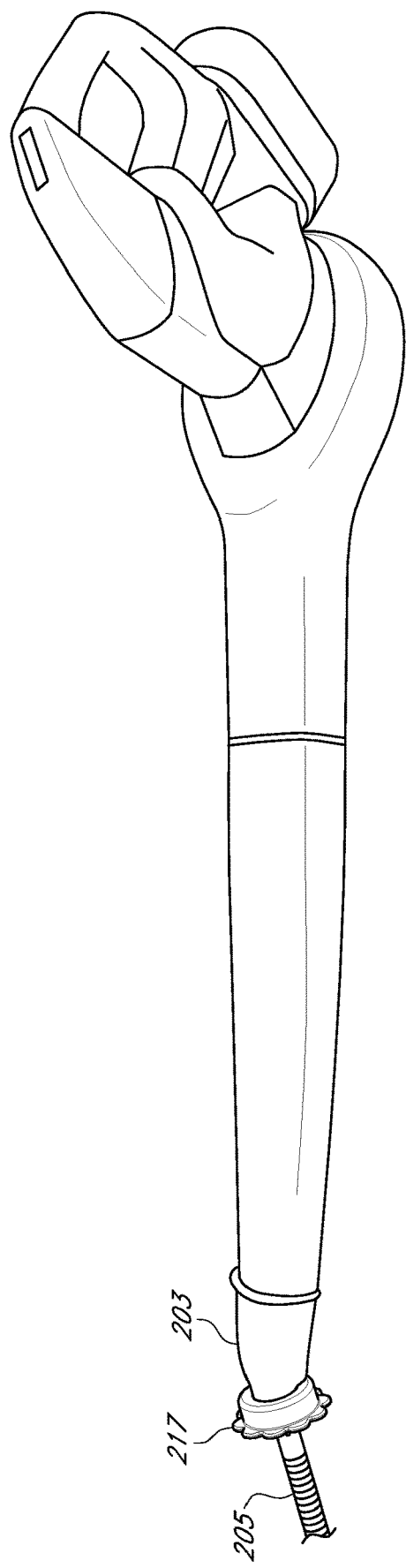
FIG. 9 is an embodiment of the bidirectional airflow attachment hose attached to a leaf blower.

The second end of the hose may have a flexible brush attachment 250 such as on one end of the hose to facilitate the hose in, for example, gathering and/or removing lint from a lint receptacle in a dryer. In some aspects, a securing means such as a clamp or glue may be used to connect the hose to the brush attachment or the brush attachment may be affixed to the hose like an elastic band around the second end of the hose as shown in FIG. 8, in a similar fashion as the elastomeric connector is affixed to a nozzle.

In some aspects, the brush attachment may be made of similar materials has similar dimensions as the elastomeric connector. In addition, the brush may also be manufactured with a sticky surface. In some aspects, a brush with a sticky surface may be made from silicones and polystyrene-ethylene-butylene-styrene.

In some embodiments, the brush attachment is an elastomeric brush attachment and may have the same ranges of sizes and dimensions as the elastomeric connector, and made from the same material as the elastomeric connector identified herein or in U.S. Pat. Nos. 10,393,300, 11,085,567, U.S. application Ser. No. 17/002,769 or U.S. Pat. No. 11,365,838. In some aspects, the TPR can include a formulation to make the brush attachment tackier so that dust can better adhere to the brush, but allow the brush to be removed and easily rinsed to remove the dust so that it is ready for reuse.

The diameter or circumference of an elastomeric brush attachment may be slightly smaller or much smaller than the outer diameter or outer circumference of the distal end of the hose, so that the brush attachment can stretch and then retract once affixed, allowing the brush attachment to grip onto the hose to prevent the brush attachment from slipping off. In some aspects, the diameter of the brush attachment 250 is cylindrical and has a diameter of about 0.25"-10", such as 0.5"-3", 0.75"-1.25" or about 1" in its resting state. The length of the brush attachment may be about 1"-20". such as 1"-12", 2'-10", 2" to 8", 2" to 4", 2'-3", 3"-8", 3"-5" or about 1", 1.5", 2", 2.5", 3", 3.5", 4", 4.5", or 5" or ranges made from these individual values. In some aspects, an elastomeric brush attachment may be cylindrical or another shape, like the shape of the elastomeric connector as recited here.

In some aspects, the brush attachment has a plurality of flexible projections 251, to assist in dislodging dust from the dryer vent or other places in need of dust removal. In some aspects, the flexible projections 251 may be made from the same material as the elastomeric connector or may include an elastomer such as TPR with additives to make the flexible projections 251 tackier so that dust can better adhere to the brush (see FIG. 8), but allow the brush to be removed and easily rinsed to remove the dust so that it is ready for reuse. The projections may have a length of from about 0.25-2" and a diameter, if cylindrical, of about 1/32"-1/2" such as 1/16". The flexible projections may be integral with the brush attachment or may be attached separately. Benefits of an elastomeric brush attachment include providing sufficient friction to loosen any dust, for example, in a lint receptacle, and the projections are sufficiently flexible to conform to the shape of a lint receptacle when in use. In addition, in some aspects, the brush attachment 250 may be easily removed for cleaning.

During assembly, a dry lubricant may be applied to the inside of the brush attachment and/or the second end of the hose to facilitate sliding the brush onto the second end of the hose. This dry lubricant may be washed off before using, for example in a dryer's lint receptacle opening, to prevent the brush attachment from sliding off the end most part of the second end of the hose, and perhaps getting lodged in the dryer's lint receptable opening. In some aspects, to keep the brush removably but more firmly attached to the second end of the hose, the second end of the hose may comprise a resistant portion such as at least one ridge or lip proximate the second end of the hose to prevent the brush from sliding off the hose. In some aspects the lip or ridge may be about 1/4" to 4" from the opening of the second end of the hose, such as 1/4" to 3", 1/4" to 2", 1/2" to 1.5" or about 1" from the opening of the second end of the hose.

In some aspects, the brush attachment 250 may be about 1/2"-3" in length such as about 1.5" in length. The width of the brush may depend on the size of the opening on the second end of the hose 205 and may have corresponding sized openings.

The bidirectional airflow attachment hose may be manufactured in a variety of ways including but not limited to injection molding or extrusion. In some aspects, the bidirectional airflow attachment hose may be manufactured in a single contiguous piece where both the connector and hose are comprised of similar material, but may allow for additional attachments to the distal hose end. The bidirectional airflow attachment hose may be manufactured using different material for the elastomeric connector and hose. In some aspects, the bidirectional airflow attachment hose comprises at least two pieces. For example, the elastomeric connector may be permanently or removeably attached, molded, clamped or screwed on to the hose component with or without male and female coupling members. In some aspects, coupling members may have corresponding parts such that one coupling member on the distal end of the elastomeric connector may connect to a corresponding coupling member secured to the opening of the hose so that the elastomeric connector may be removed from the hose. For example the elastomeric connector and the hose may be threaded, coupled, or may snap or slide together in place.

The term "nozzle" is meant to include the terminal end portion of various size and shaped nozzles that are attached to or integral with the portion of a suctioning device or blowing device, for example as used in a home, through which air is suctioned or blown, such as a vacuum cleaner nozzle, the barrel of a hair dryer, or the end of a leaf blower where air exits, with or without additional attachments through which air flows. Some nozzles allow for various an attachment tools coupled to a nozzle such as a crevice tool, an extension wand, utility nozzle with brush, upholstery tool, brush/nozzle combination that are specifically made to attach to a nozzle specific to a corresponding suctioning device such as vacuum cleaner or blowing device, which may extend the length or change the shape or function of a nozzle, which are for purposes herein may be referred to as a nozzle. Some nozzles have a male end and the attachment tool has a female end. Other nozzles have a female end and the attachment tool has a male end. In some aspects, the bidirectional airflow attachment hose herein accommodates either a male or female nozzle, or attachment tools, through which air flows, attached to nozzles. Nozzles are generally cylindrical but can be bent or include portions of, for example, a compartment of a hand held vacuum cleaner through which air is suctioned. Thus, the use of the term "nozzle" herein refers to the portion of a suctioning device or blowing device through which air may be suctioned or blown to which an elastomeric connector may be attached generally at the terminal end of the suctioning or blowing device.

FIGS. 1-11 illustrate exemplary embodiments of the bidirectional airflow attachment hose and aspects of the elastomeric connector 203, coupler/compression fitting 217, hose 205 and brush attachment 250. FIGS. 1-2 and 8-9 show embodiments of an assembled bidirectional airflow attachment hose.

The elastomeric connector 203 has a proximal end and a distal end, wherein the proximal end may be passed through and beyond a first opening of the female cap 212 when assembled. The elastomeric connector in more detail as in FIG. 3 may comprise an approximately perpendicular flange ("connector flange") 220 at a distal end thereof and an opening therethrough. The elastomeric connector flange 220 is larger (e.g., larger diameter or circumference) than the first opening 222 of the female cap 212 (FIG. 5) and is sufficiently wide so that the connector flange 220 does not slip through the first opening and can form a seal with the insert flange 241 (FIG. 7) when compressed and assembled.

The rigid compression fitting 217 when assembled may have an opening aligned with the opening of the elastomeric connector 203 so that air may pass through the bidirectional airflow attachment hose unobstructed. The components of the rigid compression fitting 217 may be made from acrylonitrile butadiene styrene (ABS) plastic or another rigid material such as polycarbonate, acrylonitrile styrene acrylate (ASA), cellulose acetate, cellulose acetate butyrate, cellulose propionate, chlorinated polyvinyl chloride, high density polyethylene, high impact polystyrene, ethylene chlorotrifluoroethylene, ethylene tetrafluoroethylene, ethylenemethyl acrylate copolymer, styrene acrylonitrile, or mixtures or copolymers thereof that have an appropriate hardness to function as described herein. In some aspects, the rigid compression fitting 217 has a durometer hardness Shore Type D value measured according to ASTM D2240 for 10 seconds at 23° C. of about 60-100 such as about 65-100, about 75-100 or about 80-100.

The rigid compression fitting 217 may comprise an insert 215 (FIG. 7), a female cap 212 (FIG. 5) and a double sided male component 213 (FIG. 6). In some aspects, the dimensions such as the inner diameter, outer diameter and the wall thickness are about the same as the male hose end of the double sided male component.

Figure 7B:
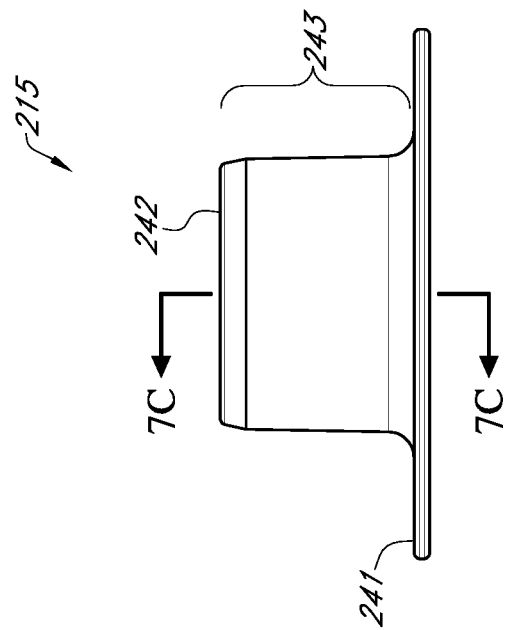
FIGS. 7a-7c are collectively a multiview view including orthogonal views of an embodiment of an insert (not drawn to scale).
Figure 7A:
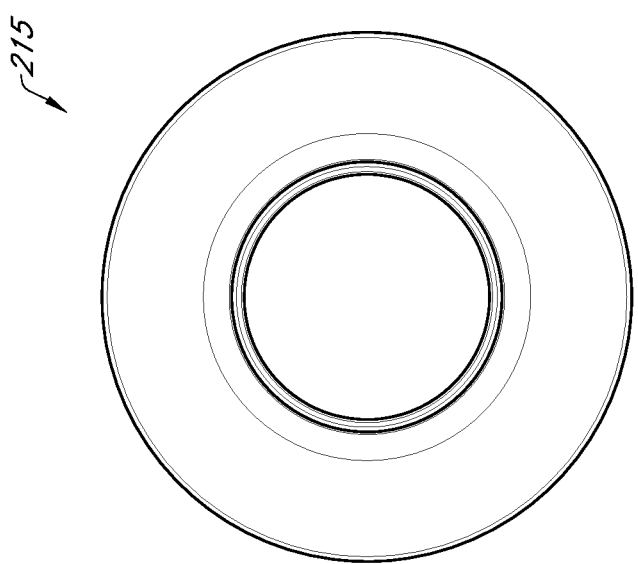
Figure 7C:
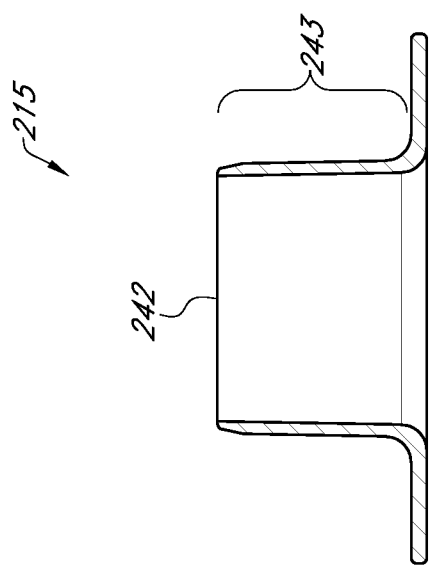

The insert 215 has a first end having an approximately perpendicular flange ("insert flange") 241 that has about the same dimensions, diameter or circumference as the connector flange and a second end having a tube 243 with a length that is shorter than a length of the elastomeric connector 203 and dimensions, diameter or a circumference that are about the same as the inner dimensions, diameter or circumference of a cross section of the distal end of elastomeric connector 203 in its resting state. In some aspects when assembled, the insert 215 may be of a sufficient height to prevent the distal end of the elastomeric connector 203 from collapsing when in use, but the tube portion 243 of the insert 215 may be sufficiently short enough, with respect to the length of the elastomeric connector, so as not to interfere with the ability of the elastomeric connector to become affixed to a nozzle. For instance, when the second end of the tube portion 243 of the insert 215 is inserted into the distal end of the elastomeric connector 203, the tube 243 may extend through and beyond the rim of the female cap 212. The extension of the tube 243 beyond the rim may allow the distal end of the elastomeric connector 203 to remain open and prevent the elastomeric connector 203 from collapsing when in use and when suction is applied. For instance, when the second end 242 of the tube 243 is inserted into the distal end of the elastomeric connector 203, the tube 243 may extend through and beyond the rim of the female cap 212. For example, the height of the insert 215 is about 5-20% the length of the elastomeric connector 203, such as about 15-20% or about 17%. In some aspects when assembled, the insert 215 may be of a sufficient height to prevent the distal end of the elastomeric connector 203 from collapsing when in use. For example, the height of the insert 215 may be about 0.4-1", for example, about 0.5" for a 2.5-4 inch length connector 203, such as a 0.5" inch high insert, for a 3" length connector. In this example, the combined height of the rim, connector flange 220 and insert flange 241 may be less than 0.3-1" such as about 0.3-0.7 inches. In some aspects, the tube and insert flange form a single integral insert as shown in FIG. 7.

Figure 10:
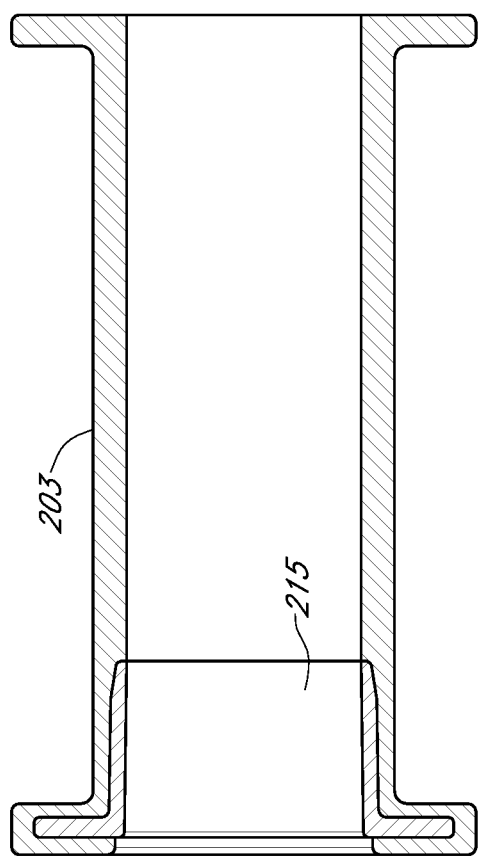
FIG. 10 is an embodiment of an integrated connector and insert.
Figure 11:
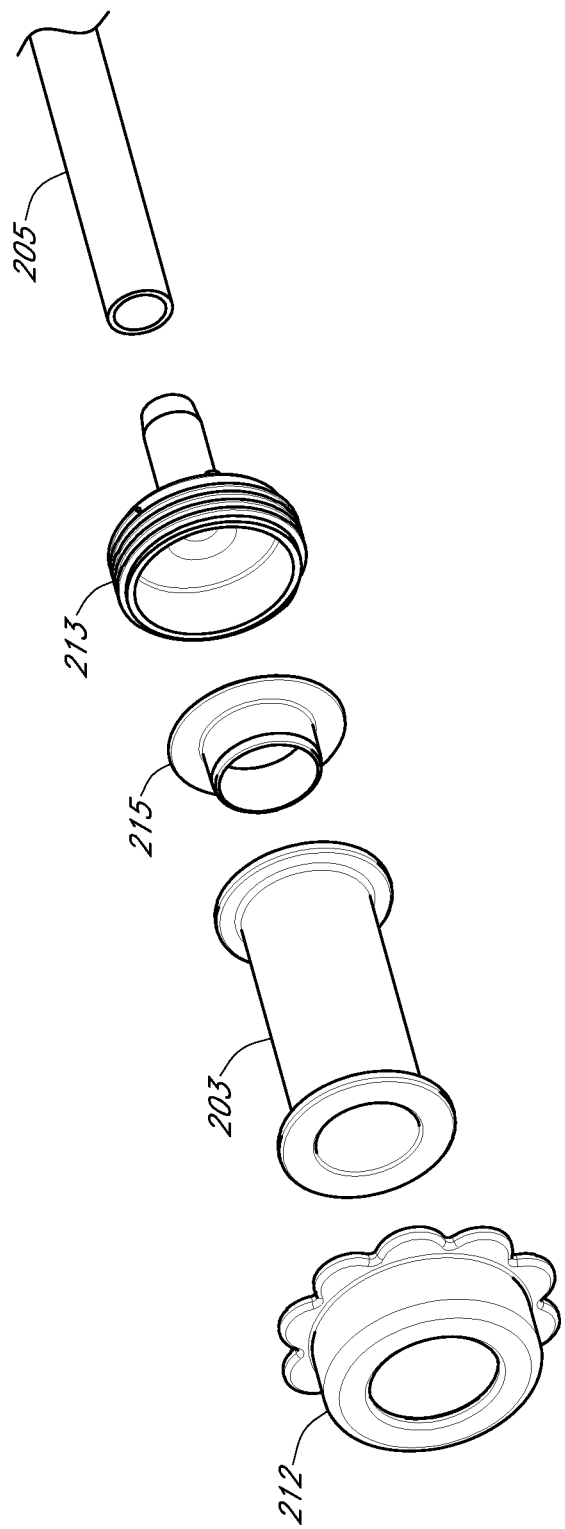
FIG. 11 is an exploded view of an embodiment of the bidirectional airflow attachment hose.

In some aspects, the insert 215 and elastomeric connector 203 may be manufactured so that the insert is at least partially embedded within the elastomeric connector as shown in FIG. 10. For instance, at least some of the insert flange 241 is covered on both sides with the elastomeric material of the elastomeric connector flange 220. In this case the insert flange 241 may have a slightly smaller diameter or circumference than the connector flange 220.

In some aspects, the insert flange and the connector flange 220 are compressed together against the rim of the female cap 212 when assembled, which may prevent the elastomeric connector from detaching, and in addition, when compressed, a seal may be formed when assembled, which may prevent air leakage from the point of coupling when the bidirectional airflow attachment hose having the connector assembly 217 is in use. Thus, the insert flange and the connector flange 220 may be of a sufficient size so that the connector flange 220 can be securely held in place by the insert flange to prevent the connector flange 220 from detaching when air flows through either the bidirectional airflow attachment hose or the connector assembly 217. In addition, in some aspects, the insert flange provides sufficient surface area to compress against the connector flange 220. In some aspects, the insert flange and the connector flange 220 may be about the same size and both can fit inside the internal outermost edges of the female cap 212. Thus, the insert flange has smaller dimensions (e.g., diameter, circumference) than the second opening 223 of the female cap 212 so it may fit inside. Therefore, the insert flange may have a size and dimension that allows passage through the second opening but not the first opening of the female cap 212. In addition, a gap between the tube and the rim may allow the elastomeric connector 203 to fit within the space when assembled. In some aspects, the gap is approximately the size and shape of a cross section of the distal end of the elastomeric connector 203. As discussed above and as shown in FIG. 5, the female cap 212 comprises a rim that may form a first opening having a smaller circumference than the insert flange, and a second opening having a larger circumference than the insert flange. The first opening may have approximately the same dimension as the cross sectional outer circumference of the elastomeric connector 203 when in a resting state. The first opening also may have a smaller circumference than the circumference of the insert flange (e.g., shown in FIG. 7a) and a larger outer circumference than an outer circumference of the tube. When "circumference" is used comparatively, the cross sections where the parts meet or portions referenced are approximately similarly shaped (e.g., round, square or rectangular) or the hose is of another shape but is sufficiently flexible to conform to another shape so the parts fit together in a way that the connector assembly functions as intended. For example, if the cylindrical elastomeric connector 203 has an outer diameter at its widest part (not including any flange portion) of about 0.5-10 inches, for example 1" to 10", 1" to 8", 2" to 5", 2" to 3", 1" to 3", or 1" to 2" such as about 1.25 or 1.5 inches, then the diameter of the first opening of the female cap 212 has about the same diameter, and thus the same circumference. A cuboid shaped connector may have the same dimensions, such as a cross section having a length and width, and therefore circumference, as a rectangular first opening having a similar length and width. In this example, the insert tube 243 would also have a shape and dimensions to fit inside the elastomeric connector. Thus, the elastomeric connector 203 can fit through the opening and extend outside the female cap 212 with no gap (which includes a minimal gap that does not interfere with the functioning of the bidirectional airflow attachment hose) between the rim and the distal end of the elastomeric connector 203. The connector flange 220 may remain inside the female cap 212 against the rim when assembled.

The second opening on the female cap 212 may receive a complementary male end 230 and may have a means for coupling. In some aspects, both the female cap 212 and the complementary male end 230 are threaded and can be coupled to form a tight closure. Other closures are also contemplated such as a cam and follower, a snap, a slide or other closure that can compress the complementary male end 230 against the insert flange 241, connector flange 220 and rim 221 of the female cap 212 when assembled. The closure allows the connector flange 220 on the distal end of the elastomeric connector 203 to stay connected to the compression fitting 217 without readily detaching from the compression fitting 217 when attached to a vacuum nozzle or when in use as a bidirectional airflow attachment hose.

Figure 5B:
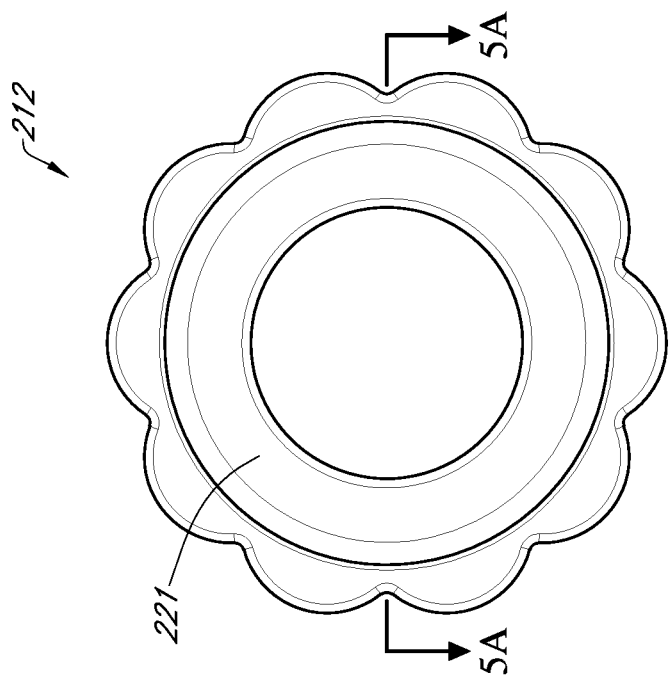
FIGS. 5a-5e are collectively a multiview view including orthogonal views of an embodiment of a female cap (not drawn to scale).
Figure 5A:
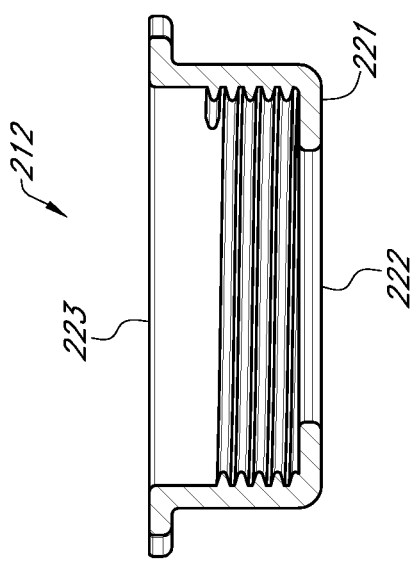
Figure 5D:
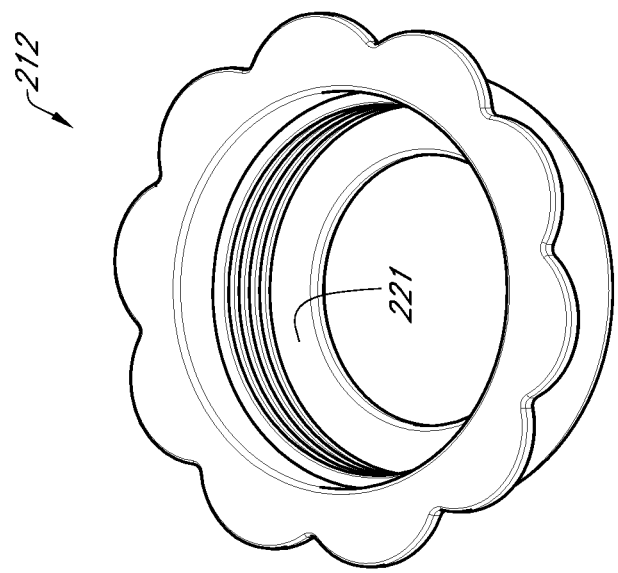
Figure 5C:
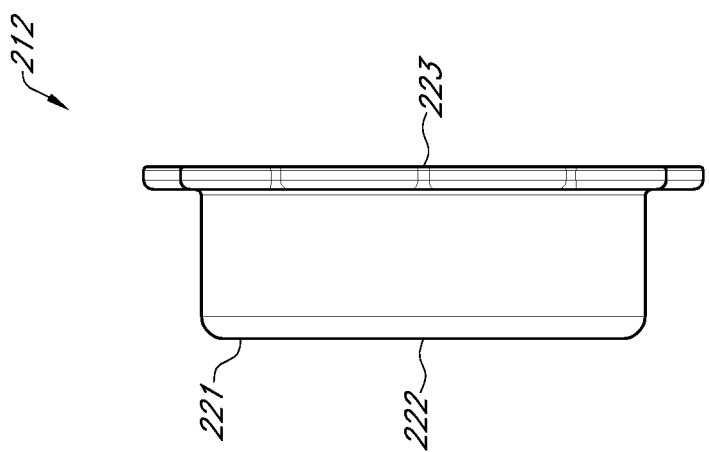
Figure 5E:
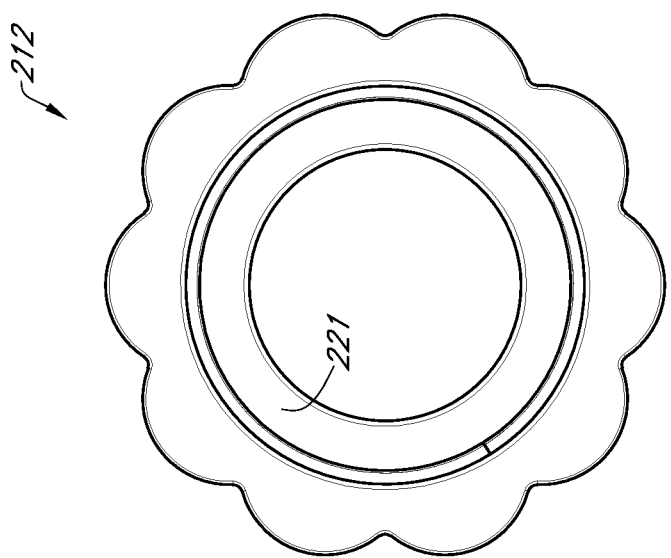
Figure 6B:
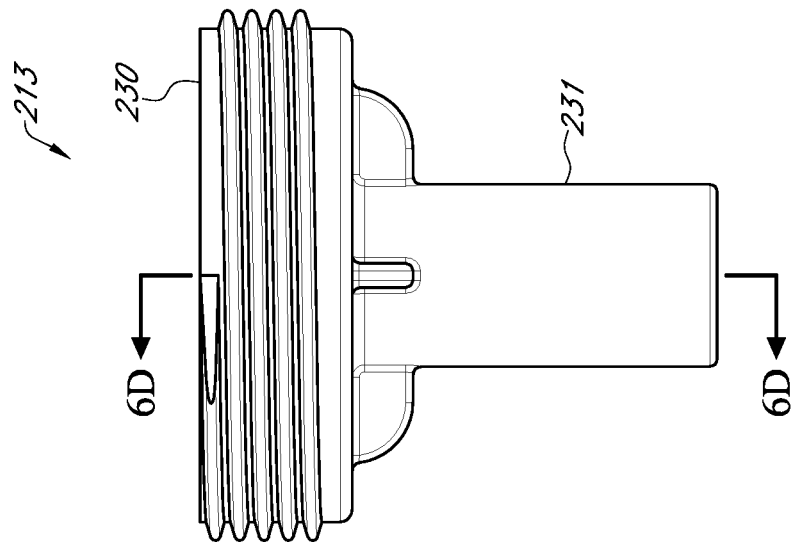
FIGS. 6a-6e are collectively a multiview view including orthogonal views of an embodiment of a double-sided male component (not drawn to scale).
Figure 6A:
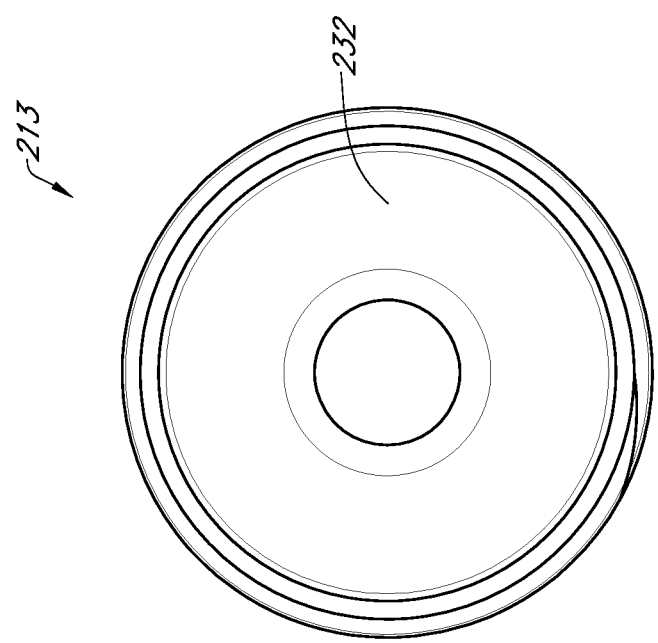
Figure 6D:
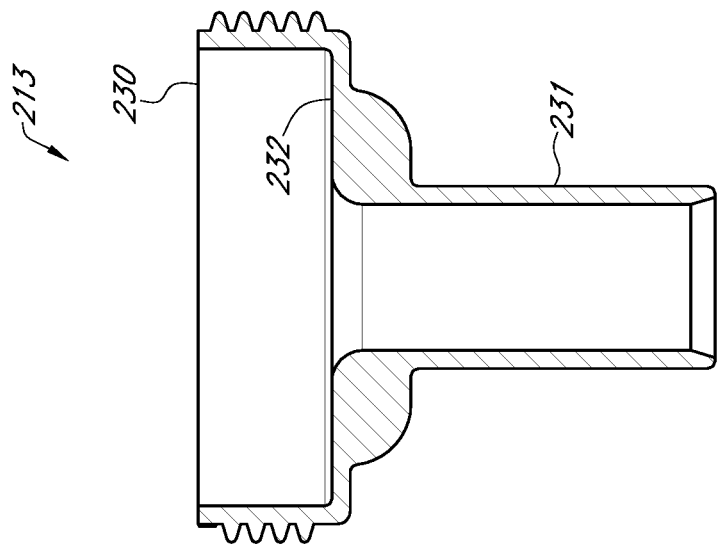
Figure 6C:
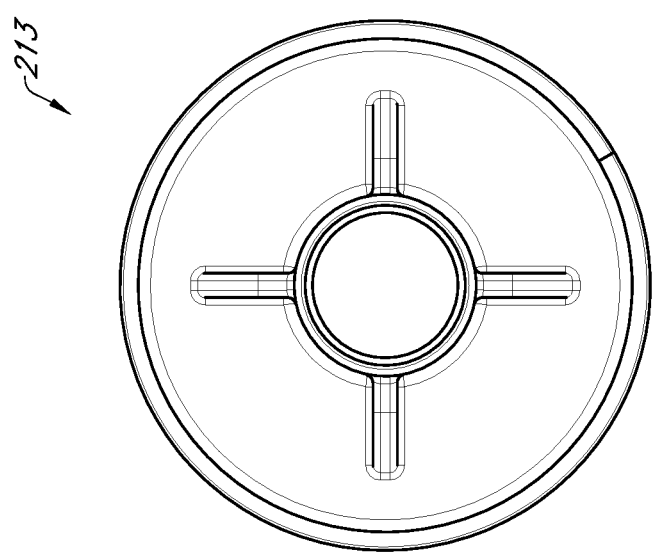
Figure 6E:
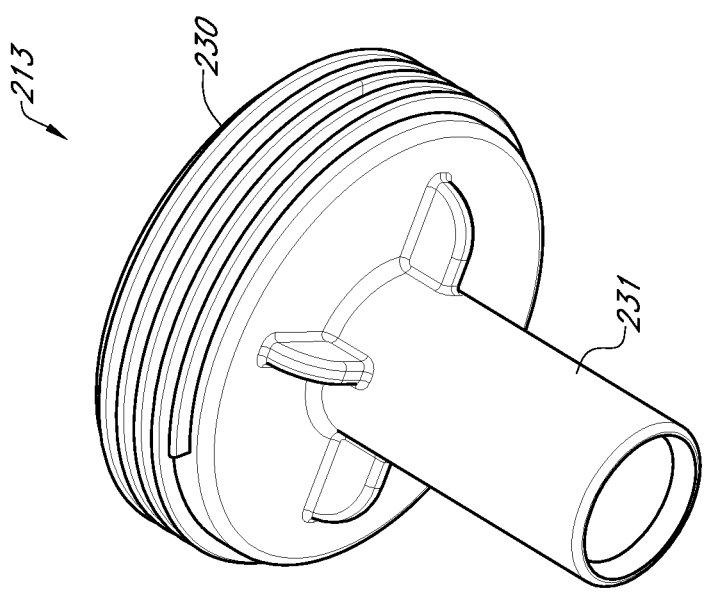

In some aspects, the height of the female cap 212 (the distance between openings i.e., between the outside of the rim 221 and the entrance to the second opening 223, see FIG. 5c) is sufficient to accommodate the insert flange, connector flange 220, and complementary male end 230. The height of the female cap 212 depends on the dimension of the components that will be inserted therein and the dimension of the remainder of the components, and may have a height of about ¼" to 5", ½ to 3", ⅕" to 1", or about 0.6-0.7" or 0.68". The second opening 223 may have larger dimensions than the first opening 222. A cylindrical second opening 223, for example, may have a diameter of about 0.5"-12", for example 1"-10", 1"-8", 1"-5", 1"-3", 1.5"-3", or 2"-2.5" or about 1.8"-1.9" such as 1.85" or having a similar circumferences based on these diameters for non-cylindrical second openings. See FIG. 5c.

In some aspects, the compression fitting 217 comprises a double sided male component 213, for example in FIG. 6. One male end may be complementary to the female cap ("complementary male end") 230 and a second male end may insert into or attach to a hose ("male hose end") 231 and positioned opposite the complementary male end 230. In some aspects, the complementary male end 230 may be larger (e.g., diameter or circumference) than the male hose end 231, and in between both ends may be a transition plane/portion 232 between a larger opening of the complementary male end 230 and a smaller opening in the male hose end 231. The double sided male component 213 may be integral with the insert flange, or may be separate components (e.g., FIG. 5, FIG. 6).

The larger opening on the complementary male end 230 of the double sided male component 213 may have dimensions that are slightly smaller than the second opening 223 of the female cap 212 but of sufficient size or dimension to engage the female cap 212. The larger opening, for example, may have a diameter of about 0.5"-12", for example 1"-10", 1"-8", 1"-5", 1"-3", 1.5"-3", or 1.5"-2" or about 1.6"-1.8" such as 1.68" or having a similar circumferences based on these diameters for non-cylindrical second openings. See FIG. 6a.

In some aspects, the height (FIG. 6b, 6d) of the complementary male end 230 may have dimensions that have a sufficient size to engage the female cap 212. The height (distance between the openings) of the complementary male end 230, for example, may be about ⅛" to 4.5", ¼" to 3", ¼" to 2", ¼" to 1" or about ½" to ¾" such as 0.55".

The outer dimensions of the male hose end may have an outer circumference or diameter that is similar to the inner circumference or diameter of the hose 205. In some aspects, when engaging a typical cylindrical hose, the outer diameter of the male hose end may be about 0.6" to 3", 0.75" to 1.5", 0.75-1" such as about ¾" outer diameter. In some aspects, a hose with an oblong cross section, or other shaped cross section, is sufficiently flexible to fit on a male hose end with a round cross section.

In some aspects, when engaging a typical cylindrical hose, the inner diameter of the male hose end at its narrowest diameter may be about 0.5" to 3", 0.5" to 2", 0.5" to 1", 0.6" to 1", such as about 0.6" or 0.7", or about 0.6", 0.625" (⅝") inner diameter of the male hose end. Using the proportions outlined herein, additional dimensions for the opening in the male hose end for particular applications can be easily calculated. Likewise, circumferences may be easily calculated as well.

In some aspects, the wall thickness of the male hose end may about ¹⁄₃₂" to ½" thick such as about ¹⁄₁₆" to ¼" thick, for example, about ¹⁄₁₆", ⅛", ³⁄₁₆" or ¼" thickness. Using the proportions outlined herein related to the inner dimensions of the male hose end and wall thicknesses, additional dimensions such as the outer dimensions for the male hose end for particular applications can be easily calculated. The male hose end 231 may have a sufficient length to engage the hose 205 and form a seal. The end of the male hose end that is inserted into or attached to the hose may be tapered to case insertion therein or untapered (see FIG. 6e). The length of the male hose end 231 depends on the size and material of the hose, and the size of the compression fitting. In some aspects, when engaging a hose, the length of male hose end 231 may be about ½" to 4", ½" to 3", ½" to 2", 1" to 2", or about 1.5 inches in length.

In some aspects, the edges of the complementary male end 230 may compress the insert flange 230 and the connector flange 220 against the rim 221 of the female cap 212 when assembled. In some aspects, when the insert flange 241 is at least partially or fully embedded in the connector flange 220, both the complementary male end 230 and the rim 221 of the female cap will come in contact with the connector flange 220 having the insert flange 241 that is sandwiched inside the connector flange 220. In some embodiments, embedding the insert in the elastomeric connecter will further prevent the elastomeric connector from detaching from the connector assembly when in use.

Typically, the components herein have cylindrical openings or are made to accommodate a cylindrical connector and hose 205 or hose with an oblong cross section (FIG. 8) as shown in the figures; however, other shapes are not precluded such as a hose with an oblong cross section attaching to a cylindrical male hose end. The bidirectional airflow attachment hose may be customized to complement a particularly shaped or sized nozzle. Generally, due to the elastomeric nature of the connector, a cylindrical connector can accommodate various shaped nozzles such as those that are round, square, rectangular, hexagonal, and can fit over entire nozzles such as female ended nozzles into which conventional attachments may be attached, male ended nozzles or attachments, for example. Nonetheless, other shaped connectors are contemplated, for example, such as cuboid, cube, cone/funnel, prism, or pyramid shaped connectors having openings on both ends, or for instance any shape having a round, square, triangular, rectangular, hexagonal or multi-sided cross section. Connector shapes need not be symmetrical and can include an asymmetrical hourglass, wavy, or custom shape, which could be similarly beneficial in particular applications. The compression fittings and hose may also match the shape of the elastomeric connector.

The rigidity of the hose 205 may be one factor for the hose 205 to function effectively without collapsing when suction is applied. In some aspects, the hose 205 is made from a material that is more rigid than the elastomeric connector. In some aspects, the hose 205 is less rigid than the compression fitting 217. For example, hose material may have a durometer hardness Shore Type A value measured according to ASTM D2240 for 10 seconds at 23° C. of about 65-100 such as about greater than 65, such as 70-100, 75-100, 75-90, 80-90, 85-95, or 90-100. In some aspects, the hose 205 is reinforced, for example with a polyester braid, spiral reinforcements, or ribbing. The hose's reinforcement may provide strength and structure that allows the hose 205 to be directed, for example into a dryer vent without curling up and kinking when being directed.

In some aspects, the hose 205 may have a wall thickness of about 0.01-1.5" such as about 0.02-0.8", about 0.05-0.8", about 0.05-0.5", about 0.08-0.3", or about 0.09-0.2", for example, about 0.1", about 0.15" or about 0.2". In some aspects, the hose 205 may have a wall thickness of about ¹⁄₃₂" to ½" thick such as about ¹⁄₁₆" to ¼" thick, for example, about ¹⁄₃₂", ¹⁄₁₆", ³⁄₃₂", ⅛", ⁵⁄₃₂", ³⁄₁₆", ⁷⁄₃₂", ¼", 9/32", 5/16", 11/32", 3/8", 13/32", 7/16", 15/32", or 1/2" or a range including any of these thicknesses.

Figure 4B:
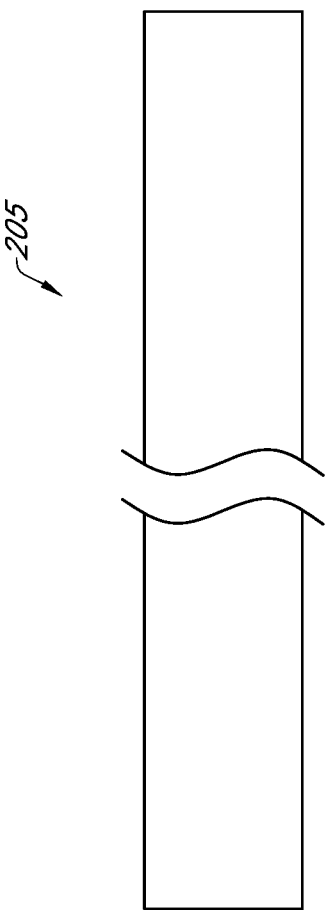
FIGS. 4a-4c include orthogonal views of embodiments of a hose (not drawn to scale).
Figure 4C:
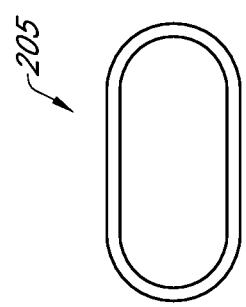
Figure 4A:
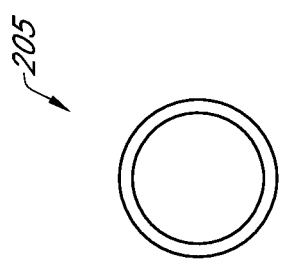

The inner dimensions such as the diameter of the hose 205 may also be a factor in providing a hose 205 that will not collapse (FIG. 4a). The inner dimensions such as the diameter of the hose 205 also may influence the rate of airflow. In some aspects, the inner dimensions such as the diameter are smaller than the dimensions such as the diameter of the larger opening of the complementary male end 230. Exemplary hose diameters or circumferences can be calculated based on the proportions of the elastomeric connector diameter or circumference provided herein. In some aspects, in a typical cylindrical hose 205, to prevent high pitched shrieking noise, the inner diameter may be greater than about 1/2" such as about 5/8" to 2", 3/4" to 1", 5/8" to 7/8", or about a 3/4" inner diameter. The outer diameter of the hose 205 takes into account the wall thickness and may be greater than about 5/8" such as about 5/8" to 3 1/8", 3/4" to 2 1/8", 7/8 to 1 1/8", such as about 5/8" to 1 1/8", or about 7/8" outer diameter (FIG. 4a, outer arrows). In some aspects, the hose cross section may be oblong or oval and has similar inner and outer circumferences as a cylindrical hose.

In some aspects, the components of the bidirectional airflow attachment hose, such as the elastomeric connector, compression fitting, and hose, are easily detachable so that if one component became damaged or worn out, the bidirectional airflow attachment hose could be disassembled and only the damaged component would need to be replaced.

FIG. 2 exemplifies how to use the assembled bidirectional airflow attachment hose illustrated in FIGS. 1 and 8. Step 1 includes stretching the elastomeric connector to accommodate the nozzle of a vacuum cleaner. Step 2 includes stretching the elastomeric connector around a nozzle and aligning the insert of the coupler with the inlet of the nozzle so that the end of the nozzle is proximate the insert. Step 3 illustrates the bidirectional airflow attachment hose affixed to a nozzle. Step 4 illustrates a method of using the bidirectional airflow attachment hose by inserting it into a dryer opening for receiving a lint receptacle.

The terms "approximately" "about" and "substantially" as used herein represent an amount close to the stated amount that still performs the desired function or achieves the desired result. For example, the terms "approximately," "about" and "substantially" may refer to an amount that is within less than 10% of, within less than 5% of, within less than 1% of, within less than 0.1% of, and within less than 0.01% of the stated amount.

All patents and publications referenced herein are incorporated herein by reference.

EXAMPLES

Example 1

A cylindrical elastomeric connector was manufactured from TPE super elastic plastic made from a propriety blend comprising primarily about 75% Kraton™ G1651 H Polymer, a clear, linear copolymer based on styrene and ethylene/butylene with a polystyrene content of 33% and about 25% Kang Libo 15 #white oil cosmetic product, as well as other additives.

The elastomeric connector had a Shore Type A value of 0 and Shore Type OO value of 40.

The elastomeric connector was about 3" long, having an internal diameter of about 1" in its resting position and about a 1/8" wall thickness. The distal end of the connector was produced with an approximately perpendicular and integral flange having a diameter of about 1.7". The outer diameter of the connector, not including the flange was about 1.25".

A compression fitting was manufactured from acrylonitrile butadiene styrene (ABS) plastic having 3 parts: an insert, a female cap and a male component.

The insert was manufactured with a flanged base having a 1.7" diameter approximately perpendicularly) (<91° and integrally connected with an approximately 0.5" length tube having an internal diameter of about 0.95" and a wall thickness of about 0.06".

The female cap was manufactured having a height of about 0.8" with an approximately 1.85" diameter threaded opening on one end for accepting a male component, and a 1.25" diameter opening on the other end for accepting the elastomeric connector. The female cap also comprised a decorative scalloped edge near the opening for receiving the male component.

A male component was manufactured with an approximately 0.6" height and 1.68" diameter threaded end for inserting into and securing the female cap, and an approximately 1.5" long tube portion having an approximately 0.6" internal diameter opening and appropriate corresponding dimensions for inserting into the hose.

An approximately 2' 7" long flexible transparent hose having an oblong cross section made from polyvinyl chloride (PVC) was made having an internal circumference of about 2.36" and having a wall thickness of about 1/16" was manufactured. Thus, the proportion of the inner circumferences of the connector of about 3.14" and the hose of about 2.36" is about 1.3. Approximately 21" of the hose had concentric ribbing, which made the hose flexible, and about 10" lacked ribbing and resulted in a stiffer portion that could be directed into a dryer vent.

The proportion of the inner diameter of the tube of the insert of 0.95" to the inner diameter of the opening of the male end that inserts into the hose of 5/8" is about 1.5.

The proportion of the length of the tube portion (0.5") to length of connector (3") is about 0.16.

The bidirectional airflow attachment hose was assembled as illustrated and resulted in a bidirectional airflow attachment hose as in FIG. 1 herein. A single bidirectional airflow attachment hose was affixed to each of:

a metal central vacuum having a male nozzle about 11.5" long, which is generally cylindrical but has a bend, and has a round end opening having an external diameter of about 1 1/8".
   a Bissel Power Force Helix 1240 upright vacuum having about 160 AW of suction power, with a plastic male nozzle about 4" long, which is cylindrical, and has an opening with a round cross section having an external diameter of about 1 1/2" and an internal diameter of about 1 1/4".
   a Shop-Vac, which is advertised to have about 370 AW, having a plastic cylindrical male nozzle about 4" long having an opening with a round cross section of about 2 1/8" outer diameter and about a 2" inner diameter,
   a Shop-Vac nozzle crevice attachment about 12" long having a female end that attaches to the male nozzle end and terminates in an opening with an oblong cross section having outer dimensions of about 2" by 3/4",
   a Bissel Powerlifter Ion Pet hand held vacuum having a lint container terminating in a slanted plastic portion about 3" by 3.5" with an opening in the slanted portion (through which air is suctioned) of about 1 3/8" by 7/8".

The proximal open end of the bidirectional airflow attachment hose was stretched about and affixed to each of the nozzles above, roughly aligning the opening on the hose on the distal end of the connector in the same direction as the nozzle, allowing air to flow from the distal hose opening of the bidirectional airflow attachment hose and subsequently through the nozzle when the vacuum is turned on and suctioning air. No space was present between the internal surface of the connector and the external surface of the nozzle. The vacuum cleaner was powered on for each vacuum, which delivered an airflow typical of vacuum cleaners for home use. The same connector portion fitted over each of the vacuums did not make a shrieking noise and did not collapse onto itself. The hose portion also did not collapse onto itself and there was no burning smell from the motor of the vacuum cleaner. When the vacuum cleaners were powered off the connector stayed connected to the respective nozzles and the vacuum cleaners were restarted with the connecter still attached. The bidirectional airflow attachment hose did not make a screeching noise when the vacuum cleaners were turned on. no suction was lost for nozzles of various sizes and shapes when the vacuum cleaner was turned on and off and the connector did not detach when powered down.

The bidirectional airflow attachment hose was used to remove dust from a dryer dust receptacle. The oblong hose fit in the small space and the dust did not clog the hose.

Example 2

The bidirectional attachment hose described in Example 1 was manufactured using a standard TPR material, ZT003-10 manufactured by Xiamen Shibo Rubber & Plastic Technology Co., LTD, which is a transparent TPR material to which color is added before it was molded into the TPR connector. The raw materials are mixed in the following proportion 99.972% TPR by weight and 0.028% colorant. The TPR ZT003-10 comprises polystyrene-block-poly (ethylene-ran-butylene)-block-polystyrene (SEBS) CAS #58-66070-4 (25% by weight), white mineral oil CAS #47-8042-5 (74.8% by weight) and polyethylene (PE) wax CAS #9002-88-4 (0.2% by weight).

The TPR has a Shore Type A value of 0, a tensile stress of 0.18 MPa at 100% and 0.46 MPa at 300%, a tensile strength at least in one direction at break of 1.5 MPa, and a tensile elongation of 660% to break, using the ASTM methods herein.

The bidirectional attachment hose made from the connector was attached to the vacuums as in Example 1 and had the same results.

Example 3

The wall thickness of the elastomeric connector is increased to 6 mm and the elastomeric connector is encased with the insert as in FIG. 10 to keep the connector more firmly connected in the connector assembly when in use. Thus the proportion of the wall thickness of about 0.236" (6 mm) to length of a 3" connector is about 0.08.

Example 4

The bidirectional airflow attachment hose of Examples 1 and 2 was fitted with an elastomeric brush attachment made from the same material as the elastomeric connector, except an elastomeric formulation was used to make the brush attachment tackier. The brush attachment had a wall thickness of about 1/16"-1/4", a length of about 4" and a plurality of integral elastomeric projections spaced along the outer surface of the length of the brush attachment. A plurality of about 10-15 rows with approximately 15-20 projections on each row having an approximately 1/16" to 1/18" diameter. The brush attachment was affixed to the stiff end of the hose and used as in Example 1 to clean a dryer dust receptacle. The brush loosened the dust in places that the hose did not suction and the dust adhered to the brush. After cleaning the dryer receptacle, the brush attachment was removed and rinsed with water to remove the dust that adhered to it.

Example 5

The bidirectional airflow attachment hose was made as in Examples 1 and 2. A single bidirectional airflow attachment hose was affixed, without any additional adaptors, to each of:
A leaf blower having a terminal end with an oblong oval cross section measuring about 2" by approximately 1/2".
A hair dryer having a terminal end with a round cross section measuring about 1¾" round.
Each of the leaf blower and hair dryer was powered on, and air was blown from the hose end, and the connector remained attached, and continued to remain attached when powering off and then on again.

Example 5-Commercial Success

The TikTok Shop is currently in the early testing stage in the United States. The TikTok Shop links product videos directly to a shopping platform where viewers of a TikTok video can purchase the featured product using the integrated platform. Prior to the TikTok Shop, products could be featured in TikTok videos but purchasers would need to buy the featured product in an unrelated shopping platform such as Amazon or a company website. The TikTok Shop limited sales of products to 200 units per day for new sellers. TikTok Shop assigns an account manager only for successful TikTok Shop sellers.

The bidirectional airflow attachment hose of Examples 2 and 4 was launched on Feb. 20, 2023 on Amazon as the "Dust Daisy". About two months later, in April 2023, the seller uploaded a TikTok Shop video featuring the use of the bidirectional airflow attachment hose (Dust Daisy). After the original video was uploaded, the maximum allowed units were sold (200) each day for the next 10 days, and continued to sell thereafter.

In addition, after the TikTok Shop video was uploaded, Amazon purchases substantially increased over the period of time when the maximum allowed units were sold in the TikTok Shop, which was attributed to TikTok purchasers seeking out the product on another shopping platform due to the limited product sales allowed in the TikTok Shop platform.

Due to the successful sales, the TikTok Shop assigned an account manager to the seller who is the inventor of the present application. After working with the initial account manager for a short time, a higher level and more experienced TikTok Shop account manager was assigned due to the potential volume anticipated for the bidirectional airflow attachment hose (marketed as the Dust Daisy).

Comparative Example 1a

The "Lint Lizard" lint vacuum hose attachment has been available on Amazon and is advertised to remove lint from dryer vents and behind hard to reach areas. The Lint Lizard includes an approximately 13.5" relatively inflexible funnel portion and a relatively more flexible hose portion in comparison to the funnel portion, which is about 2.5'. The proximal end of the funnel comprises an approximately 5.4" receiver portion for receiving a vacuum nozzle. The diameter is largest at the opening of the receiver portion and the diameter incrementally decreases distally from the opening toward the narrowest portion of the funnel portion. The funnel and hose portions are unable to be separated. The funnel portion is advertised as a "universal vacuum attachment [that] attaches to most vacuums". The receiving portion contains four gasket-like protrusions throughout its length integrally attached to the receiver portion. The four gasket-like protrusions appear to be made from the same relatively inflexible material but are thin enough to bend. The wall thickness of the receiver portion is approximately ⅛" and the protrusions have a wall thickness of about ¹⁄₃₂". The receiver portion appears to allow the edge of a vacuum nozzle to be wedged in to the point where the diameter of the receiver portion is about the same diameter as the nozzle. Thus, the receiver portion's sloping sides appear to accommodate different diameter nozzles that can be pushed into the receiver portion at various depths depending on the diameter of the nozzle. The gasket-like protrusions appear to assist keeping a nozzle in place while in use. In addition, suction from a vacuum cleaner also appears to assist keeping a nozzle in place while in use.

The hose portion appears to be a translucent hose with spiral ribbing that appears to allow the hose to bend. The wall thickness appears to be very thin, less than about ¹⁄₃₂".

Various Amazon.com reviewers of the Lint Lizard stated:

"The hose needs to be stiffer because it is so flimsy that you can't even direct it anywhere.:("

"However, it WILL NOT go down inside of the vent. It's too flexible and just curls up on itself. You could do just as well with the crevice tool on your vacuum cleaner. I spent an hour trying to figure out ways to 'help' it into the dryer vent, and it just will not go. The ribs on it don't help, either."

"What the description didn't say is that the end of the Lizard is held in place on the Shark vacuum hose by Suction [sic]. Translation the moment you move the Shark handle you loose [sic] suction and you find yourself reattaching the Lizard. This is a C H E A P product. Save yourself the money and do not buy this product. I don't complain very often on product but this one is worthless. The concept is good it just needs a redesign. This is not a one size fits all."

"The hose is not sturdy enough to vacuum out large clumps of lint, and when it does suction out the lint, it gets trapped causing a clog. It clogs very easy. I followed the directions on how to hold the hose while using and it didn't work."

"Did not work well at all, was not able to go around corners, came of vaccume [sic]."

"Disappointed That [sic] part of the hose is directly hooked to the attachment to your vacuum so you can't remove and add your own stiffer hose. They should make the hose stiffer or allow you to remove and add your own"

"Rubber hose is not stiff enough so just rolls up on itself when you stick it in the lint catcher."

"I really wanted this to work, and spent some time maneuvering the nozzle. Very little suction combined with a narrow nozzle that immediately clogged."

"Broke immediately upon attaching to my vacuum. Had to use duct tape to seal it off, which then affected the suction power. Also, just generally very awkward to use when attached to a vacuum with a handle type attachment. Very disappointed."

"It doesn't fit my vacuum."

"This product had no suction and didnt [sic] work for me."

"I am unable to use this with my Dyson vacuum."

"It doesn't fit my Kennmore at all."

"Hose is too soft, that it can't go into the hole of the dryer. Fixture attached to the vacuum does not stay or hold on the vacuum."

"Piece of crap . . . hose is flimsy curls-nothing fits together properly, won't attach securely to my vacuum attachment. Not at all like it's pictured in the ad. Sad."

"Worthless. It wouldn't stay on my regular vacuum hose. Stayed on my handheld vacuum but when I tried to suck the junk out of the dryer it would not stay straight. It just curled back up as packaged. It got some lose [sic] stuff out but left A LOT behind! I had to dig it out. I have returned it.

"Bought this product and found it not much different from others. I thought I had done a thorough investigation into lint cleaners. I found this was not up to par as described. Please note: The connection will ONLY work if your vacuum has a male receiver end. I have a Kenmore canister vacuum which has a female receiver for the wand. I was able to accommodate the fit by sliding over the crevice attachment. Unfortunately I still had to remove the filter receptical in order to be able to slide the hose into the lint catcher. The hose is flimsy to say the least and kinks easily. The end of the hose is not finished or stiff enough to handle a thorough deep cleaning of your lint trap. Sorry to say I was not satisfied with this product."

Comparative Example 1b

PetOde Dryer Vent Cleaner also has been available on Amazon.com and is a similar to the Lint Lizard in Comparative Example 1a with a funnel portion with internal gasket-like projections for attachment to a vacuum nozzle and a ribbed hose that is available online on Amazon.com. The funnel portion is shorter than the Lint Lizard. Various Amazon.com reviewers of the PetOde stated:

"Its difficult to steer a highly flexible piece of plastic into a confined space. Its harder when there is a permanent bend in the plastic."

"Definitely not worth the effort of ordering. The extension tube can't handle the suction power. It is made from too thin plastic and closes itself, therefore loosing [sic] all suction capabilities. If you use the hose without the extension tube it makes high weezing sound that is painful."

"Not as universally compatible with vacuums. It wouldn't properly attach to my Shark vacuum."

"Doesn't stay together and kept clogging with very small amounts of lint (dime size). Kept having to take it apart and unclog it."

"It made the most high pitch noise, it was ear shattering. I tried multiple times to re attach it to stop the noise but nothing worked, so it went back! Don't buy unless you want to go deaf!"

"as soon as I placed it in the dryers lint filter it folds against the walls and It [sic] is not strong enough to go straight down. I am returning it"

"Wasn't compatible with my vacuum. I have a shark. When it kind of worked it made this terrible whistle sound."

"And the coils are brittle, that's how it broke one of the coils bent and snapped in half while using it."

"Flexible is not always a good thing. This is hard to control. It's too soft and light too control the direction."

"The vent hose comes kinked in the box. The tube is too big to get down in my dryer vent. When you do try to push it down the vent, it kinks up in the places where they were from being in the box."

"Didn't work. My vacuumed sucked it shut. And it makes the worst high pitch squealing. Hurts your ears so bad you have to shut it off before you can actually try it."

"Does not stay attached to each piece. You have to tape the sections if you want to clean dryer vents. Flimsy material does not remain sturdy to suck out dryer screen vent."

"The hose that goes into the vent is made of cheap, thin plastic. The suction causes the walls of the hose to suck together. Thus, nothing can be sucked in from the dryer. Doesn't work."

"I have a Kenmore canister so the end of the handle is too wide to accommodate this product."

"It is decent but you need to tape the ends together. I didn't and now I'm desperately trying to squeeze my hand down there to get the attachment out. I will use again but the parts will be securely duct taped together."

"Didn't fit my vacuum. Also there is not enough "give" to get into all the nooks and crannies. Waste of money."

"Didn't fit my dryer or my vacume [sic] cleaner. Sent back. Also seems very cheap."

"Couldn't install didn't fit the vacuum."

"Does not work well. Does not allow for enough suction to pull the lint out well. Would not buy this again."

"Not nearly stiff enough to push into dryer vent tunnel. Kinks in tubing introduced by poor packaging make the product even more useless that [sic] it might otherwise would be. Don't waste your money. Said it would fit all vacuums but did not fit mine. A waste of money. And I have a shark vacuum a reputable brand."

Comparative Example 1c

The Sealegend Dryer Vent Cleaner with Guide Wire is similar to the PetOde hose of comparative Example 1b and contains an additional guide wire, which is available on Amazon.com. Various Amazon.com reviewers of the Sealegend Dryer Vent Cleaner stated:

"This thing didn't really fit onto the wand of my basement vacuum. Plus the tube thing was so stiff, that it kept curling up inside the lint trap. I only noticed that it grabbed basic pieces of lint. My regular wand attachment did a much better job."

"Check your dryer and see how you access the vent that leads outside before you get this. To get to the vent that leads outside, there's a hard turn in mine. This flimsy little tube couldn't make the turn so I wasn't able to get to any of the lint. Kind of useless for my dryer."

"Due to the way it was packaged, the tube is bended and you have no control where it goes. So the tube curls up at a clean corner of my dryer vent so there was absolutely no lint suctioned! A total waste of money."

"The picture shows the extension having a guide handle, what I received did not. The item sent to me has a thin wire that wraps around the tube to keep it sort of stiff, but it's very hard to control. And the tube is so tiny that it clogs the second it gets near lint, which means I spend more time unclogging it than actually cleaning anything."

"I tried this in my dryer, and was able to reach more lint than I could with my vacuum attachments right up until the point when the metal guidewire on this tool got stuck. The guide wire is supposed to push the hose into the crevasses inside the dryer lint trap but it got stuck on a metal panel and I couldn't pull it back out. Ultimately, I had to use a pliers to cut the guidewire to pull the tool out. Luckily Amazon refunded my money. Hopefully I haven't damaged anything inside my dryer . . . "

"I had trouble getting the hose to stay attached to my vacuum."

"when I hooked it up to my vacuum the rubber end of this just gets sucked together from the suction of my vacuum instead of pulling the lint out. I tried it on several different types of vacuums and no matter which one I used they all had the same problem."

"I was hoping for something that had flexibility with SOME firmness to it to allow for a bit of control while using it. This is too flimsy and I can't control where it goes at all. The hole is too small to really suck anything up into the vacuum, so I'm constantly having to take it out of the vent to unclog it. Definitely do not recommend."

"The plastic handle on the metal guide fell off before I even used it. With the metal guide on it wouldn't even go into my lint filter hole. With the metal guide off I was able to get it down but it kept clogging up and I had to pull it back out several times to take the lint out of the end of the hose."

"The hose that goes into your dryer is so small and just gets clogged. The wire attached to the end is basically a flimsy hanger wrapped around the tube. Finally, when attaching your vaccum hose if your vaccum has to much suction it collapses the rubber part you put the hose in."

"I hoped it would work. The hose diameter is less than 5/8 inches and very unwieldy and puts a strain on the vacuum. The photo that shows a pile of lint is misleading."

"I have purchased some useful items from Amazon this is not one of then. There's no way to control the hose and wire no matter what I've tried it doesn't work,I think the metal should be Inside the hose as it is its useless to me.

"Blue section was so small in diameter that my shop vac would not fit. Pictures in ad not represent the product. Buyer beware.

"My vacuum worked fine until I attached this. 3 minutes later, my vacuum started making an awful smell and quit working. This device is too small for a vacuum with powerful suction. RIP Dyson. I do NOT recommend this product."

"This product is awful. It doesn't stay on the vacuum and is too rigid to get down in the lint trap. The only way i was able to get it to work was with Duct tape holding it on and forcing it in to the trap. I would not buy this item if i would have known this was how it was going to work."

"It's flimsy but not flimsy or controllable enough to do what needs to be done. I would've been better off buying expandable hose and duct taping it to the front of my vacuum and running some kind of flimsy wire along with outside so I could control it."

"The hose is too flexible. It only worked well in the section where the lint filter sits. It does stay on the vacuum hose but i couldn't push it in any further because it just rolled back on itself. Not worth the money or the effort."

"Tube is too flexible. I can't push it down into the accordian dryer vent tube or into the space where the filter goes in the front of my dryer. It pushes down maybe an inch or two before it just curls up in place even if the vacuum cleaner is not on.

"The metal wire guide is too flimsy to guide the hose any deeper than what you can reach with your hands, hose is just as flimsy! No point in buying!"

"I have both a Sebo and a Dyson and I tried both and nothing. I held my hand over the end and barely any suction. Save your money!

The tube was 2' versus the 3½ described. It was crimped in places making it unable to suction and difficult to maneuver. I had to return it.

"Not compatible with all vacuum cleaners."

"Buyer beware! I attached this to my shark vacuum and within 5 minutes of use it killed my vacuum!! So upsetting!!"

Not as pictured. The wire piece is wrapped around the tube in 3 spots, not 1. Difficult to get off and doesn't work well to guide the tube. Tube with wire doesn't fit in vent hole very well and it doesn't move freely. Will be returning."

"This did not fit either of my vacuum cleaners. Even if it had, the section that is supposed to actually go into the dryer vent is almost impossible to straighten and is so small in diameter I can't imagine that it would do much. I wouldn't recommend this product.

"This thing is very flimpsy [sic] and I can barely use it, barely suck anything due to the opening is too small. Wont [sic] buy this again."

"I purchased this item. First it doesn't work with a dyson but in the process of figuring this out it broke. Had to throw it away."

"I attached it to my Dyson and it did not make a strong enough connection to produce suction. I got one little chunk of lint in the hose, but it got stuck in the middle of the hose."

"This product is flimsy and not easy to get into your vent to get it clean."

Not very good, the metal part makes it easy to get stuck on things."

"The metal part broke off after only one use I am very dissatisfied with this product"

"Does not fit any vacuum! We tried two different types and it won't fit. Not worth it at all."

"It's a great concept but didn't work with our Dyson stick vacuums."

"I'm sure it's a good product HOWEVER I have a 1996 Kenmore stackable & it didn't work on it. No problems to advise anything is wrong with the item."

Concept is great and idea is good to prevent lint build up, but product restricts vac to the point that vacuums with auto shut off for a clog will shutoff every time, even a shop vac pulled the ball into the shutoff like it was full. Was not able to use effectively with any vac in the house."

"Doesn't fit on my vacuum very well . . . "

"We have a dyson v8 and unfortunately it doesn't fit either suction adapter."

"Great concept but unfortunately did not work at all for me. I tried it with 2 different vacuums and the tube is so small that the lint was getting stuck in the tube. Ended up being a waste of $15."

"Does not fit shark lift away."

"The suction is good however the hose is not sturdy enough . . . it kinks too easily and won't travel thru the duct areas inside the dryer. I am returning this product."

"The hose isn't stiff enough to get into the areas where the lint actually is stuck in the dryer. did [sic] not work as directed. could not get the hose into the drier vent, kept bending and getting caught."

"The metal coil got stuck on the ledge in my dryer where I couldn't see, so this was useless for me.

Comparative Example 2

A converter hose marketed as the "Rinseroo" was based on U.S. Pat. Nos. 10,393,300, 11,085,567, and U.S. application Ser. No. 17/002,769. Specifically, a cylindrical connector as illustrated in FIGS. 6-13 in U.S. application Ser. No. 17/002,769 was manufactured from TPE super elastic plastic cylindrical elastomeric connector is made from a propriety blend comprising primarily about 75% Kraton™ G1651 H Polymer, a clear, linear copolymer based on styrene and ethylene/butylene with a polystyrene content of 33% and about 25% Kang Libo 15 #white oil cosmetic product, as well as other additives. The connector was about 4.5" long, having an internal diameter of about 1". The distal end of the elastomeric connector was produced with an approximately perpendicular and integral elastomeric flange having a diameter of about 1.7". The outer diameter of the connector, not including the flange was about 1.25" and had a wall thickness of about ⅛".

A compression fitting was manufactured from acrylonitrile butadiene styrene (ABS) plastic having 3 parts: the insert, the female cap and a male component.

The insert was manufactured with a flanged base having a 1.7" diameter approximately perpendicularly) (<91° and integrally connected with an approximately 0.62" length tube having an internal diameter of about 0.95". The wall thickness was about 0.06".

The female cap was manufactured having a height of about 0.8" with a 1.85" diameter threaded opening on one end for accepting a male component, and a 1.25" diameter opening on the other end for accepting the connector. The female cap also comprised a decorative scalloped edge near the opening for receiving the male component.

A male component was manufactured with an approximately 0.6" threaded end for inserting into and securing the female cap, and an approximately 1.5" long tube portion having an approximately 0.4" internal diameter opening and appropriate dimensions for inserting into the hose. An approximately 2.5'-3' long flexible hose made from polyvinyl chloride (PVC) having an internal diameter of about 0.5" was manufactured having a wall thickness of about 1/16"-⅛". The converter hose was assembled as illustrated in FIG. 7 in U.S. application Ser. No. 17/002,769 and resulted in a converter hose as in FIG. 6 therein.

The proportion of the connector inner diameter to the hose inner diameter is about 2. The proportion of the inner diameter of the tube portion of the insert of about 0.95" to inner diameter of the male end that inserts into the hose of 0.41" is about 2.3. The length of the tube of the insert of about 0.62" to length of a 4.5" connector is about 0.14.

The converter hose marketed as the Rinseroo was tested as a vacuum attachment. A single Rinseroo converter hose was affixed to each of the vacuum cleaner nozzles identified in Example 1. Each of these vacuums having an affixed Rinseroo connector hose were turned on. The central vacuum, the Bissel Power Force Helix upright vacuum and the Shop-Vac having the attached Rinseroo converter hose resulted in a high-pitched shrieking noise emanating from the converter hose. In addition, each of the vacuums having an affixed Rinseroo connector hose were used to remove lint from dryer vents and lint receptacles; however, lint became stuck in the hose and was difficult to remove from the hose. The connector was difficult to position without the connector collapsing in the space between the nozzle and the connector assembly during vacuuming.

In addition, the same Rinseroo converter hose was affixed to a Eureka Rally 2 canister vacuum cleaner having a suction of about 100 AW and used to clean out a dryer opening for receiving a lint receptacle. After a few minutes, a burning smell started emanating from the vacuum's motor and the vacuum cleaner was turned off to prevent burning out the motor.

Comparative Example 3

A single Rinseroo converter hose was affixed, without any additional adaptors, to each of:
  A leaf blower having a terminal end with an oblong oval cross section measuring about 1" by 3".
  A hair dryer having a terminal end with a round cross section measuring about 1¾" round.

Each of the leaf blower and hair dryer was powered on as in Comparative Example 2. The connector of the Rinseroo converter hose that was attached to the leaf blower for approximately 10 seconds extended like a balloon and appeared to be on the verge of coming off or breaking so the leaf blower was powered off. Regarding the hairdryer, a burning smell developed after using the hairdryer for about 15 seconds.

The invention claimed is:

1. A bidirectional airflow connector assembly comprising
  an elastomeric connector having an opening therethrough comprising a body portion and a connector flange portion at a distal end thereof;
  wherein the connector flange portion is approximately perpendicular to the body portion;
  a rigid compression fitting having an opening aligned with the opening of the elastomeric connector;
  wherein the rigid compression fitting comprises a female cap, a double sided male component, and an insert having dimensions to fit therebetween;
  wherein the insert comprises a tube portion and an insert flange portion, wherein the insert flange portion is approximately perpendicular to the tube portion;
  wherein the insert flange portion is proximate a first end of the insert and is about the same circumference as the connector flange portion;
  wherein the tube portion is proximate a second end of the insert and has a length that is shorter than a length of the elastomeric connector and has an outer circumference that is about the same as the inner circumference of the elastomeric connector;
  wherein the double sided male component comprises a male hose end; and
  wherein a proportion of an inner diameter of the tube portion proximate the insert flange portion to a narrowest inner diameter of the male hose end, or a proportion of an inner circumference of the tube portion proximate the insert flange portion to the narrowest inner circumference of the male hose end, is 2:1 or less.

2. The bidirectional airflow connector assembly of claim 1 wherein
  a proportion of a distance between openings in the tube portion to a distance between openings of the elastomeric connector in a resting state is about 0.16:1 to 0.25:1; and/or
  a proportion of a wall thickness of the elastomeric connector at the distal end thereof to the distance between openings of the elastomeric connector in the resting state is about 0.05:1 to 0.12:1.

3. The bidirectional airflow connector assembly of claim 1
  wherein the proportion of the inner diameter of the tube portion proximate to the insert flange portion to the narrowest inner diameter of the male hose end, or the proportion of the inner circumference of the tube portion to the narrowest inner circumference of the male hose end is about 1:1 to 1.8:1.

4. The bidirectional airflow connector assembly of claim 1
  wherein a first end of the double sided male component has an outer circumference that is larger than an outer circumference of the second end of the double sided male component.

5. The bidirectional airflow connector assembly of claim 1
  wherein the inner diameter of the tube portion proximate to the insert flange portion is about ⅞" to 1⅛" and the narrowest inner diameter of the male hose end is about ½ to ¾".

6. The bidirectional airflow connector assembly of claim 2
  wherein the distance between the openings in the tube portion is at least 0.3" to about 2"; and
  wherein distance between openings of the elastomeric connector is about 1.5-3.5 inches.

7. The bidirectional airflow connector assembly of claim 2
  wherein the wall thickness is about ⅛" to ½"; and
  wherein the distance between openings of the elastomeric connector is about 1.5"-3.5".

8. A bidirectional airflow attachment hose comprising
  the bidirectional airflow connector assembly of claim 1; and
  a hose coupled to the male hose end.

9. The bidirectional airflow attachment hose of claim 8
  wherein the hose is more rigid than the elastomeric connector.

10. The bidirectional airflow attachment hose of claim 8
  wherein the distal end of the elastomeric connector in a resting state has an inner diameter and/or an inner circumference and a first end of the hose has an inner diameter and/or an inner circumference; and
  wherein a proportion of the inner diameter of the elastomeric connector at the distal end thereof in the resting state to the inner diameter of the first end of the hose, and/or a proportion of the inner circumference of the distal end of the elastomeric connector in the resting state to the inner circumference of the first end of the hose, is about 1:1 to 1.5:1.

11. The bidirectional airflow attachment hose of claim 10
  wherein the hose is more rigid than the elastomeric connector.

12. The bidirectional airflow attachment hose of claim 8
  wherein the proportion of the inner diameter of the tube portion to the inner diameter of the male hose end is about 1:1 to 1.8:1.

13. The bidirectional airflow attachment hose of claim 8
  wherein the elastomeric connector is cylindrical and a length of the elastomeric connector is about 1.5 to 3.5 times an inner diameter of the elastomeric connector.

14. The bidirectional airflow attachment hose of claim 8
  wherein the elastomeric connector:
  remains affixed to a vacuum cleaner nozzle if suction is lost or the vacuum cleaner is shut off when in use;
  self seals about peripheries of vacuum cleaner nozzles having either a male terminal end or female terminal end using a single elastomeric connector when in use;
  self seals about peripheries of a cylindrical nozzle and a cuboid nozzle using a single elastomeric connector when in use; or
  self seals about peripheries of cylindrical nozzles having an approximately 1" outer diameter and an approximately 3" outer diameter using a single elastomeric connector when in use.

15. The bidirectional airflow attachment hose of claim 8 wherein:

the elastomeric connector has a wall thickness of about ⅛" to ¼", the elastomeric connector has an inner diameter of about ¾" to 1¼";

the hose has an inner circumference of about 3"-4"; or the hose comprises a polyethylene hose having an oblong cross section.

16. The bidirectional airflow attachment hose of claim 8 wherein a majority of an internal surface area of the elastomeric connector in a resting state directly contacts an external surface of a nozzle when affixed thereto when in use.

17. The bidirectional airflow attachment hose of claim 8 wherein the elastomeric connector comprises a thermoplastic elastomer or mixture thereof that has a durometer hardness Shore Type A value of about 0-10 or Shore Type OO value of about 30-50.

18. The bidirectional airflow attachment hose of claim 8 wherein the hose further comprises a flexible brush proximate a distal end of the hose on an outer surface of the hose.

19. The bidirectional airflow attachment hose of claim 18 wherein the hose further comprises a ridge or lip proximate the distal end of the hose to prevent the brush from slipping off the hose when in use.

20. A method of using the bidirectional airflow attachment hose of claim 8 comprising affixing a proximal end of the elastomeric connector to a vacuum cleaner nozzle or blowing device.

* * * * *